United States Patent
Grab et al.

(10) Patent No.: US 10,397,292 B2
(45) Date of Patent: Aug. 27, 2019

(54) SYSTEMS, METHODS, AND MEDIA FOR DELIVERY OF CONTENT

(71) Applicant: DIVX, LLC, San Diego, CA (US)

(72) Inventors: Eric W Grab, San Diego, CA (US); Abhishek Shivadas, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 188 days.

(21) Appl. No.: 13/844,445

(22) Filed: Mar. 15, 2013

(65) Prior Publication Data

US 2014/0280763 A1 Sep. 18, 2014

(51) Int. Cl.
*H04L 29/06* (2006.01)
*H04L 29/08* (2006.01)
(Continued)

(52) U.S. Cl.
CPC .......... *H04L 65/60* (2013.01); *H04L 65/4084* (2013.01); *H04L 65/605* (2013.01);
(Continued)

(58) Field of Classification Search
CPC ... H04L 65/605; H04L 65/80; H04L 65/4084; H04L 41/0213; H04L 29/08144; H04L 29/08072; H04L 29/06; H04L 29/0809; H04L 29/08117; H04L 67/1095; H04L 67/02; H04L 67/06; H04L 65/60; H04L 67/2842; G06Q 30/02; G06F 12/023; G06F 12/0246; G06F 3/067; G06F 21/10;
(Continued)

(56) References Cited

U.S. PATENT DOCUMENTS

| 4,009,331 A | 2/1977 | Goldmark et al. |
| 4,694,357 A | 9/1987 | Rahman et al. |

(Continued)

FOREIGN PATENT DOCUMENTS

| CN | 1169229 | 12/1997 |
| CN | 1221284 A | 6/1999 |

(Continued)

OTHER PUBLICATIONS

"Supported Media Formats", Supported Media Formats, Android Developers, Nov. 27, 2013, 3 pgs.
(Continued)

*Primary Examiner* — Hitesh Patel
*Assistant Examiner* — Clifton Houston
(74) *Attorney, Agent, or Firm* — KPPB LLP

(57) ABSTRACT

Systems, methods, and computer readable media for delivery of content are provided. In some embodiments, systems for controlling delivery of content are provided, the systems comprising processing circuitry configured to: receive a request to stream the content, the request being received from a user equipment device; determine a first location of the user equipment device; determine a count of user equipment devices that are located at the first location and are currently streaming the content; determine whether the count meets a threshold; and responsive to determining that the count meets the threshold, add a first content delivery network to a pool of one or more content delivery networks that are used to stream the content.

12 Claims, 6 Drawing Sheets

(51) Int. Cl.
 *G06F 15/16* (2006.01)
 *G06Q 10/10* (2012.01)
(52) U.S. Cl.
 CPC .......... *H04L 65/80* (2013.01); *H04L 67/2842* (2013.01); *G06Q 10/10* (2013.01); *H04L 67/1008* (2013.01)
(58) Field of Classification Search
 CPC ......... H04N 21/23439; H04N 21/4622; H04N 21/64738; H04N 21/23103; H04N 21/23106; H04N 21/8456; H04N 21/2181; H04N 21/44209; H04N 21/238; H04N 21/4392; H04N 21/44004; H04N 21/4425; H04N 21/845; H04N 21/8586
 See application file for complete search history.

(56) References Cited

U.S. PATENT DOCUMENTS

| | | |
|---|---|---|
| 4,802,170 A | 1/1989 | Trottier |
| 4,964,069 A | 10/1990 | Ely |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,479,303 A | 12/1995 | Suzuki et al. |
| 5,487,167 A | 1/1996 | Dinallo et al. |
| 5,502,766 A | 3/1996 | Boebert et al. |
| 5,509,070 A | 4/1996 | Schull |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,583,652 A | 12/1996 | Ware |
| 5,589,993 A | 12/1996 | Naimpally et al. |
| 5,627,936 A | 5/1997 | Prasad |
| 5,633,472 A | 5/1997 | DeWitt et al. |
| 5,642,171 A | 6/1997 | Baumgartner et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,403 A | 2/1998 | Stefik |
| 5,717,816 A | 2/1998 | Boyce et al. |
| 5,719,786 A | 2/1998 | Nelson et al. |
| 5,745,643 A | 4/1998 | Mishina |
| 5,751,280 A | 5/1998 | Abbott |
| 5,754,648 A | 5/1998 | Ryan et al. |
| 5,763,800 A | 6/1998 | Rossum et al. |
| 5,765,164 A | 6/1998 | Prasad et al. |
| 5,794,018 A | 8/1998 | Vrvilo et al. |
| 5,805,700 A | 9/1998 | Nardone et al. |
| 5,822,524 A | 10/1998 | Chen et al. |
| 5,828,370 A | 10/1998 | Moeller et al. |
| 5,841,432 A | 11/1998 | Carmel et al. |
| 5,844,575 A | 12/1998 | Reid |
| 5,848,217 A | 12/1998 | Tsukagoshi et al. |
| 5,867,625 A | 2/1999 | McLaren |
| 5,887,110 A | 3/1999 | Sakamoto et al. |
| 5,892,900 A | 4/1999 | Ginter et al. |
| 5,903,261 A | 5/1999 | Walsh et al. |
| 5,907,597 A | 5/1999 | Mark |
| 5,946,446 A | 8/1999 | Yanagihara |
| 5,956,729 A | 9/1999 | Goetz et al. |
| 5,959,690 A | 9/1999 | Toebes, VIII et al. |
| 5,999,812 A | 12/1999 | Himsworth |
| 6,031,622 A | 2/2000 | Ristow et al. |
| 6,038,257 A | 3/2000 | Brusewitz et al. |
| 6,044,469 A | 3/2000 | Horstmann |
| 6,046,778 A | 4/2000 | Nonomura et al. |
| 6,047,100 A | 4/2000 | McLaren |
| 6,058,240 A | 5/2000 | McLaren |
| 6,064,794 A | 5/2000 | McLaren et al. |
| 6,065,050 A | 5/2000 | DeMoney |
| 6,018,611 A | 6/2000 | Nogami et al. |
| 6,079,566 A | 6/2000 | Eleftheriadis et al. |
| 6,097,877 A | 8/2000 | Katayama et al. |
| 6,141,754 A | 10/2000 | Choy |
| 6,155,840 A | 12/2000 | Sallette |
| 6,169,242 B1 | 1/2001 | Fay et al. |
| 6,175,921 B1 | 1/2001 | Rosen |
| 6,192,319 B1 | 2/2001 | Simonson et al. |
| 6,195,388 B1 | 2/2001 | Choi et al. |
| 6,204,883 B1 | 3/2001 | Tsukagoshi |
| 6,222,981 B1 | 4/2001 | Rijckaert |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,308,005 B1 | 10/2001 | Ando et al. |
| 6,330,286 B1 | 12/2001 | Lyons et al. |
| 6,374,144 B1 | 4/2002 | Viviani et al. |
| 6,389,218 B2 | 5/2002 | Gordon et al. |
| 6,389,473 B1 | 5/2002 | Carmel et al. |
| 6,395,969 B1 | 5/2002 | Fuhrer |
| 6,397,230 B1 | 5/2002 | Carmel et al. |
| 6,418,270 B1 | 7/2002 | Steenhof et al. |
| 6,449,719 B1 | 9/2002 | Baker |
| 6,466,671 B1 | 10/2002 | Maillard et al. |
| 6,466,733 B1 | 10/2002 | Kim |
| 6,510,513 B1 | 1/2003 | Danieli |
| 6,510,554 B1 | 1/2003 | Gordon et al. |
| 6,621,979 B1 | 9/2003 | Eerenberg et al. |
| 6,625,320 B1 | 9/2003 | Ghanbari |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,697,568 B1 | 2/2004 | Kaku |
| 6,725,281 B1 | 4/2004 | Zintel et al. |
| 6,771,703 B1 | 8/2004 | Oguz et al. |
| 6,807,306 B1 | 10/2004 | Girgensohn et al. |
| 6,810,031 B1 | 10/2004 | Hegde et al. |
| 6,810,389 B1 | 10/2004 | Meyer |
| 6,819,394 B1 | 11/2004 | Nomura et al. |
| 6,850,252 B1 | 2/2005 | Hoffberg |
| 6,856,997 B2 | 2/2005 | Lee et al. |
| 6,859,496 B1 | 2/2005 | Boroczky et al. |
| 6,917,652 B2 | 7/2005 | Lyu |
| 6,944,621 B1 | 9/2005 | Collart |
| 6,944,629 B1 | 9/2005 | Shioi et al. |
| 6,956,901 B2 | 10/2005 | Boroczky et al. |
| 6,965,724 B1 | 11/2005 | Boccon-Gibod et al. |
| 6,965,993 B2 | 11/2005 | Baker |
| 6,985,588 B1 | 1/2006 | Glick et al. |
| 6,988,144 B1 | 1/2006 | Luken et al. |
| 7,007,170 B2 | 2/2006 | Morten |
| 7,023,924 B1 | 4/2006 | Keller et al. |
| 7,043,473 B1 | 5/2006 | Rassool et al. |
| 7,127,155 B2 | 10/2006 | Ando et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,185,363 B1 | 2/2007 | Narin et al. |
| 7,197,234 B1 | 3/2007 | Chatterton |
| 7,209,892 B1 | 4/2007 | Galuten et al. |
| 7,231,132 B1 | 6/2007 | Davenport |
| 7,237,061 B1 | 6/2007 | Boic |
| 7,242,772 B1 | 7/2007 | Tehranchi |
| 7,328,345 B2 | 2/2008 | Morten et al. |
| 7,330,875 B1 | 2/2008 | Parasnis et al. |
| 7,340,528 B2 | 3/2008 | Noblecourt et al. |
| 7,349,886 B2 | 3/2008 | Morten et al. |
| 7,356,143 B2 | 4/2008 | Morten |
| 7,356,245 B2 | 4/2008 | Belknap et al. |
| 7,366,788 B2 | 4/2008 | Jones et al. |
| 7,376,831 B2 | 5/2008 | Kollmyer et al. |
| 7,406,174 B2 | 7/2008 | Palmer |
| 7,421,411 B2 | 9/2008 | Kontio et al. |

(56) References Cited

U.S. PATENT DOCUMENTS

| | | |
|---|---|---|
| 7,457,359 B2 | 11/2008 | Mabey et al. |
| 7,472,280 B2 | 12/2008 | Giobbi |
| 7,478,325 B2 | 1/2009 | Foehr |
| 7,484,103 B2 | 1/2009 | Woo et al. |
| 7,493,018 B2 | 2/2009 | Kim |
| 7,499,938 B2 | 3/2009 | Collart |
| 7,526,450 B2 | 4/2009 | Hughes et al. |
| 7,594,271 B2 | 9/2009 | Zhuk et al. |
| 7,610,365 B1 | 10/2009 | Kraft et al. |
| 7,640,435 B2 | 12/2009 | Morten |
| 7,689,510 B2 | 3/2010 | Lamkin et al. |
| 7,720,352 B2 | 5/2010 | Belknap et al. |
| 7,747,853 B2 | 6/2010 | Candelore et al. |
| 7,761,892 B2 | 7/2010 | Ellis et al. |
| 7,779,097 B2 | 8/2010 | Lamkin et al. |
| 7,817,608 B2 | 10/2010 | Rassool et al. |
| 7,869,691 B2 | 1/2011 | Kelly et al. |
| 7,962,942 B1 | 6/2011 | Craner |
| 7,974,714 B2 | 7/2011 | Hoffberg |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,245,124 B1 | 8/2012 | Gupta |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,289,338 B2 | 10/2012 | Priyadarshi et al. |
| 8,291,460 B1 | 10/2012 | Peacock |
| 8,296,434 B1 | 10/2012 | Miller et al. |
| 8,311,111 B2 | 11/2012 | Xu |
| 8,311,115 B2 | 11/2012 | Gu et al. |
| 8,321,556 B1 | 11/2012 | Chatterjee et al. |
| 8,386,621 B2 | 2/2013 | Park |
| 8,401,900 B2 | 3/2013 | Cansler et al. |
| 8,412,841 B1 | 4/2013 | Swaminathan et al. |
| 8,452,110 B2 | 5/2013 | Shoham et al. |
| 8,456,380 B2 | 6/2013 | Pagan |
| 8,472,792 B2 | 6/2013 | Butt et al. |
| 8,473,630 B1 | 6/2013 | Galligan et al. |
| 8,510,303 B2 | 8/2013 | Soroushian et al. |
| 8,510,404 B2 | 8/2013 | Carmel et al. |
| 8,515,265 B2 | 8/2013 | Kwon et al. |
| 8,516,529 B2 | 8/2013 | Lajoie et al. |
| 8,595,378 B1 * | 11/2013 | Cohn ................. H04L 65/4076 709/238 |
| 8,606,069 B2 | 12/2013 | Okubo et al. |
| 8,640,166 B1 | 1/2014 | Craner et al. |
| 8,681,866 B1 | 3/2014 | Jia |
| 8,726,264 B1 | 5/2014 | Allen et al. |
| RE45,052 E | 7/2014 | Li |
| 8,774,609 B2 | 7/2014 | Drake et al. |
| 8,781,122 B2 | 7/2014 | Chan et al. |
| 8,787,570 B2 | 7/2014 | Braness et al. |
| 8,805,109 B2 | 8/2014 | Shoham et al. |
| 8,806,188 B2 | 8/2014 | Braness et al. |
| 8,843,586 B2 | 9/2014 | Pantos et al. |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,636 B2 | 12/2014 | Kiefer |
| 8,918,908 B2 | 12/2014 | Ziskind et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,025,659 B2 | 5/2015 | Soroushian et al. |
| 9,042,670 B2 | 5/2015 | Carmel et al. |
| 9,094,737 B2 | 7/2015 | Shivadas et al. |
| 9,191,457 B2 | 11/2015 | Van der Schaar |
| 9,197,685 B2 | 11/2015 | Soroushian et al. |
| 9,210,481 B2 | 12/2015 | Braness et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,264,475 B2 | 2/2016 | Shivadas et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,883,204 B2 | 1/2018 | Braness et al. |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2002/0026560 A1 | 2/2002 | Jordan et al. |
| 2002/0034252 A1 | 3/2002 | Owen et al. |
| 2002/0051494 A1 | 5/2002 | Yamaguchi et al. |
| 2002/0057898 A1 | 5/2002 | Normile |
| 2002/0059170 A1 | 5/2002 | Vange et al. |
| 2002/0062313 A1 | 5/2002 | Lee et al. |
| 2002/0076112 A1 | 6/2002 | Devara |
| 2002/0087569 A1 | 7/2002 | Fischer et al. |
| 2002/0091665 A1 | 7/2002 | Van Beek et al. |
| 2002/0093571 A1 | 7/2002 | Hyodo |
| 2002/0110193 A1 | 8/2002 | Yoo et al. |
| 2002/0116481 A1 * | 8/2002 | Lee ................. H04L 29/06 709/220 |
| 2002/0118953 A1 | 8/2002 | Kim |
| 2002/0120934 A1 | 8/2002 | Abrahams et al. |
| 2002/0136298 A1 | 9/2002 | Anantharamu et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0161462 A1 | 10/2002 | Fay |
| 2002/0180929 A1 | 12/2002 | Tseng et al. |
| 2002/0184159 A1 | 12/2002 | Tayadon et al. |
| 2002/0191112 A1 | 12/2002 | Akiyoshi et al. |
| 2002/0191959 A1 | 12/2002 | Lin et al. |
| 2002/0191960 A1 | 12/2002 | Fujinami et al. |
| 2003/0001964 A1 | 1/2003 | Masukura et al. |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1 | 2/2003 | Wee |
| 2003/0061305 A1 | 3/2003 | Copley et al. |
| 2003/0061369 A1 | 3/2003 | Aksu et al. |
| 2003/0065777 A1 | 4/2003 | Mattila et al. |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0152370 A1 | 8/2003 | Otomo et al. |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0006701 A1 | 1/2004 | Kresina |
| 2004/0021684 A1 | 2/2004 | Millner |
| 2004/0024688 A1 | 2/2004 | Bi et al. |
| 2004/0025180 A1 | 2/2004 | Begeja et al. |
| 2004/0031058 A1 | 2/2004 | Reisman |
| 2004/0039916 A1 | 2/2004 | Aldis et al. |
| 2004/0047614 A1 | 3/2004 | Green |
| 2004/0052501 A1 | 3/2004 | Tam |

(56) References Cited

U.S. PATENT DOCUMENTS

| | | |
|---|---|---|
| 2004/0071453 A1 | 4/2004 | Valderas |
| 2004/0081333 A1 | 4/2004 | Grab |
| 2004/0081434 A1 | 4/2004 | Jung et al. |
| 2004/0088412 A1* | 5/2004 | John ................. G06F 16/40 709/226 |
| 2004/0093618 A1 | 5/2004 | Baldwin et al. |
| 2004/0105549 A1 | 6/2004 | Suzuki et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0158878 A1 | 8/2004 | Ratnakar et al. |
| 2004/0184534 A1 | 9/2004 | Wang |
| 2004/0202320 A1 | 10/2004 | Amini et al. |
| 2004/0217971 A1 | 11/2004 | Kim |
| 2004/0255115 A1 | 12/2004 | DeMello et al. |
| 2004/0255236 A1 | 12/2004 | Collart |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0055435 A1 | 3/2005 | Gbadegesin et al. |
| 2005/0071280 A1 | 3/2005 | Irwin et al. |
| 2005/0071469 A1 | 3/2005 | McCollom et al. |
| 2005/0108320 A1 | 5/2005 | Lord et al. |
| 2005/0114896 A1 | 5/2005 | Hug |
| 2005/0149450 A1 | 7/2005 | Stefik et al. |
| 2005/0180641 A1 | 8/2005 | Clark |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0254508 A1 | 11/2005 | Aksu et al. |
| 2005/0273695 A1 | 12/2005 | Schnurr |
| 2005/0275656 A1 | 12/2005 | Corbin et al. |
| 2006/0026294 A1 | 2/2006 | Virdi et al. |
| 2006/0036549 A1 | 2/2006 | Wu |
| 2006/0037057 A1 | 2/2006 | Xu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0093320 A1 | 5/2006 | Hallberg et al. |
| 2006/0120378 A1 | 6/2006 | Usuki |
| 2006/0129909 A1 | 6/2006 | Butt et al. |
| 2006/0156330 A1* | 7/2006 | Chiu ................. G06Q 10/10 725/24 |
| 2006/0168639 A1 | 7/2006 | Gan et al. |
| 2006/0173887 A1 | 8/2006 | Breitfeld et al. |
| 2006/0179239 A1 | 8/2006 | Fluhr |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2006/0294164 A1 | 12/2006 | Armangau et al. |
| 2007/0005333 A1 | 1/2007 | Setiohardjo et al. |
| 2007/0031110 A1 | 2/2007 | Rijckaert |
| 2007/0044010 A1 | 2/2007 | Sull et al. |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0133603 A1 | 6/2007 | Weaver |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0174209 A1 | 7/2007 | Fallon et al. |
| 2007/0178933 A1 | 8/2007 | Nelson |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0217339 A1 | 9/2007 | Zhao |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0271317 A1 | 11/2007 | Carmel et al. |
| 2007/0271385 A1* | 11/2007 | Davis ................. G06F 11/203 709/228 |
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008455 A1 | 1/2008 | De Lange et al. |
| 2008/0043832 A1 | 2/2008 | Barkley et al. |
| 2008/0066099 A1 | 3/2008 | Brodersen et al. |
| 2008/0066181 A1 | 3/2008 | Haveson et al. |
| 2008/0086456 A1 | 4/2008 | Rasanen et al. |
| 2008/0086747 A1 | 4/2008 | Rasanen et al. |
| 2008/0101466 A1 | 5/2008 | Swenson et al. |
| 2008/0104633 A1 | 5/2008 | Noblecourt et al. |
| 2008/0114891 A1* | 5/2008 | Pereira ................. H04L 12/1854 709/231 |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0126248 A1 | 5/2008 | Lee et al. |
| 2008/0137541 A1 | 6/2008 | Agarwal |
| 2008/0137736 A1 | 6/2008 | Richardson et al. |
| 2008/0151817 A1 | 6/2008 | Fitchett |
| 2008/0155061 A1 | 6/2008 | Afergan et al. |
| 2008/0172441 A1 | 7/2008 | Speicher et al. |
| 2008/0187283 A1 | 8/2008 | Takahashi |
| 2008/0192818 A1 | 8/2008 | DiPietro et al. |
| 2008/0195664 A1 | 8/2008 | Maharajh et al. |
| 2008/0195744 A1 | 8/2008 | Bowra et al. |
| 2008/0205860 A1 | 8/2008 | Holtman |
| 2008/0240144 A1 | 10/2008 | Kruse et al. |
| 2008/0256105 A1 | 10/2008 | Nogawa et al. |
| 2008/0260028 A1 | 10/2008 | Lamy-Bergot et al. |
| 2008/0262824 A1 | 10/2008 | Oslake et al. |
| 2008/0263354 A1 | 10/2008 | Beuque |
| 2008/0279535 A1 | 11/2008 | Haque et al. |
| 2008/0294453 A1 | 11/2008 | Baird-Smith et al. |
| 2008/0298358 A1 | 12/2008 | John et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0168795 A1 | 7/2009 | Segel et al. |
| 2009/0169181 A1 | 7/2009 | Priyadarshi et al. |
| 2009/0172167 A1 | 7/2009 | Drai et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |

(56) References Cited

U.S. PATENT DOCUMENTS

| | | |
|---|---|---|
| 2009/0228395 A1 | 9/2009 | Wegner et al. |
| 2009/0290706 A1 | 11/2009 | Amini et al. |
| 2009/0290708 A1 | 11/2009 | Schneider et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0036954 A1 | 2/2010 | Sakata et al. |
| 2010/0040351 A1 | 2/2010 | Toma et al. |
| 2010/0057928 A1 | 3/2010 | Kapoor et al. |
| 2010/0058405 A1 | 3/2010 | Ramakrishnan et al. |
| 2010/0074324 A1 | 3/2010 | Qian et al. |
| 2010/0074333 A1 | 3/2010 | Au et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142917 A1 | 6/2010 | Isaji |
| 2010/0158109 A1 | 6/2010 | Dahlby et al. |
| 2010/0161825 A1 | 6/2010 | Ronca et al. |
| 2010/0166060 A1 | 7/2010 | Ezure et al. |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2010/0250532 A1 | 9/2010 | Soroushian et al. |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |
| 2010/0313226 A1 | 12/2010 | Cholas et al. |
| 2010/0319014 A1 | 12/2010 | Lockett et al. |
| 2010/0319017 A1 | 12/2010 | Cook |
| 2010/0332595 A1* | 12/2010 | Fullagar ............ H04N 7/17354 709/203 |
| 2011/0002381 A1 | 1/2011 | Yang et al. |
| 2011/0016225 A1* | 1/2011 | Park ................ H04N 21/44209 709/234 |
| 2011/0047209 A1 | 2/2011 | Lindholm et al. |
| 2011/0055585 A1 | 3/2011 | Lee |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0107379 A1 | 5/2011 | Lajoie et al. |
| 2011/0116772 A1 | 5/2011 | Kwon et al. |
| 2011/0126191 A1 | 5/2011 | Hughes et al. |
| 2011/0129011 A1 | 6/2011 | Cilli et al. |
| 2011/0135090 A1 | 6/2011 | Chan |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0153835 A1* | 6/2011 | Rimac ................ H04L 67/104 709/227 |
| 2011/0184738 A1 | 7/2011 | Kalisky et al. |
| 2011/0191439 A1* | 8/2011 | Dazzi ................ G06F 15/16 709/217 |
| 2011/0191587 A1 | 8/2011 | Tian et al. |
| 2011/0191803 A1 | 8/2011 | Baldwin et al. |
| 2011/0197237 A1 | 8/2011 | Turner |
| 2011/0197238 A1* | 8/2011 | Li ................ H04N 21/2225 725/93 |
| 2011/0213827 A1 | 9/2011 | Kaspar et al. |
| 2011/0222786 A1 | 9/2011 | Carmel et al. |
| 2011/0225302 A1* | 9/2011 | Park ................ H04L 65/4084 709/227 |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0252118 A1 | 10/2011 | Pantos et al. |
| 2011/0264530 A1 | 10/2011 | Santangelo et al. |
| 2011/0268178 A1 | 11/2011 | Park |
| 2011/0276695 A1 | 11/2011 | Maldaner et al. |
| 2011/0283012 A1 | 11/2011 | Melnyk |
| 2011/0291723 A1 | 12/2011 | Hashimoto |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon et al. |
| 2012/0005368 A1 | 1/2012 | Knittle et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0066360 A1* | 3/2012 | Ghosh ................ H04L 43/0864 709/223 |
| 2012/0093214 A1 | 4/2012 | Urbach |
| 2012/0114302 A1 | 5/2012 | Randall et al. |
| 2012/0124191 A1* | 5/2012 | Lyon ................ H04L 67/1008 709/223 |
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0166633 A1* | 6/2012 | Baumback .......... H04L 43/0817 709/224 |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1* | 9/2012 | Ma ................ H04N 21/23439 725/114 |
| 2012/0254455 A1 | 10/2012 | Adimatyam et al. |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0289147 A1 | 11/2012 | Raleigh et al. |
| 2012/0294355 A1 | 11/2012 | Holcomb et al. |
| 2012/0297039 A1* | 11/2012 | Acuna ................ H04L 67/1097 709/223 |
| 2012/0307883 A1 | 12/2012 | Graves |
| 2012/0311094 A1 | 12/2012 | Biderman et al. |
| 2012/0314778 A1 | 12/2012 | Salustri et al. |
| 2012/0317235 A1* | 12/2012 | Nguyen ................ H04L 12/18 709/219 |
| 2013/0007223 A1 | 1/2013 | Luby et al. |
| 2013/0013730 A1* | 1/2013 | Li ................ H04L 65/80 709/217 |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0055084 A1 | 2/2013 | Soroushian et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |

(56) References Cited

U.S. PATENT DOCUMENTS

| | | |
|---|---|---|
| 2013/0080772 A1 | 3/2013 | McGowan et al. |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0128962 A1 | 5/2013 | Rajagopalan et al. |
| 2013/0152767 A1 | 6/2013 | Katz et al. |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179992 A1 | 7/2013 | Ziskind et al. |
| 2013/0182952 A1 | 7/2013 | Carmel et al. |
| 2013/0196292 A1 | 8/2013 | Brennen et al. |
| 2013/0212228 A1* | 8/2013 | Butler .................. H04L 65/605 709/219 |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227122 A1 | 8/2013 | Gao |
| 2013/0227573 A1 | 8/2013 | Morsi et al. |
| 2013/0290697 A1 | 10/2013 | Wang et al. |
| 2013/0301424 A1* | 11/2013 | Kotecha .................. H04W 4/06 370/242 |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0013103 A1 | 1/2014 | Giladi et al. |
| 2014/0037620 A1 | 2/2014 | Ferree et al. |
| 2014/0047069 A1* | 2/2014 | Ma .................. H04N 21/23439 709/218 |
| 2014/0052823 A1 | 2/2014 | Gavade et al. |
| 2014/0059156 A1 | 2/2014 | Freeman, II et al. |
| 2014/0101445 A1 | 4/2014 | Giladi et al. |
| 2014/0101722 A1 | 4/2014 | Moore |
| 2014/0119432 A1 | 5/2014 | Wang et al. |
| 2014/0122698 A1 | 5/2014 | Batrouni et al. |
| 2014/0140396 A1 | 5/2014 | Wang et al. |
| 2014/0140417 A1 | 5/2014 | Shaffer et al. |
| 2014/0143301 A1* | 5/2014 | Watson .................. H04L 69/14 709/203 |
| 2014/0143431 A1* | 5/2014 | Watson ............... H04L 65/4084 709/227 |
| 2014/0143440 A1 | 5/2014 | Ramamurthy et al. |
| 2014/0164584 A1* | 6/2014 | Joe ...................... H04L 61/1511 709/223 |
| 2014/0177734 A1 | 6/2014 | Carmel et al. |
| 2014/0189065 A1 | 7/2014 | van der Schaar et al. |
| 2014/0195686 A1 | 7/2014 | Yeager et al. |
| 2014/0201382 A1 | 7/2014 | Shivadas et al. |
| 2014/0211840 A1 | 7/2014 | Butt et al. |
| 2014/0211859 A1 | 7/2014 | Carmel et al. |
| 2014/0241420 A1 | 8/2014 | Orton-jay et al. |
| 2014/0241421 A1 | 8/2014 | Orton-jay et al. |
| 2014/0250473 A1 | 9/2014 | Braness et al. |
| 2014/0258714 A1 | 9/2014 | Grab |
| 2014/0269269 A1 | 9/2014 | Kovvali et al. |
| 2014/0269927 A1 | 9/2014 | Naletov et al. |
| 2014/0269936 A1 | 9/2014 | Shivadas et al. |
| 2014/0297804 A1 | 10/2014 | Shivadas et al. |
| 2014/0297881 A1 | 10/2014 | Shivadas et al. |
| 2014/0355668 A1 | 12/2014 | Shoham et al. |
| 2014/0355958 A1 | 12/2014 | Soroushian et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |
| 2014/0376720 A1 | 12/2014 | Chan et al. |
| 2015/0006662 A1 | 1/2015 | Braness |
| 2015/0026677 A1 | 1/2015 | Stevens et al. |
| 2015/0049957 A1 | 2/2015 | Shoham et al. |
| 2015/0058228 A1 | 2/2015 | Voeller |
| 2015/0063693 A1 | 3/2015 | Carmel et al. |
| 2015/0067715 A1* | 3/2015 | Koat ...................... H04H 60/15 725/25 |
| 2015/0104153 A1 | 4/2015 | Braness et al. |
| 2015/0117836 A1 | 4/2015 | Amidei et al. |
| 2015/0117837 A1 | 4/2015 | Amidei et al. |
| 2015/0139419 A1 | 5/2015 | Kiefer et al. |
| 2015/0188758 A1 | 7/2015 | Amidei et al. |
| 2015/0188842 A1 | 7/2015 | Amidei et al. |
| 2015/0188921 A1 | 7/2015 | Amidei et al. |
| 2015/0189017 A1 | 7/2015 | Amidei et al. |
| 2015/0189373 A1 | 7/2015 | Amidei et al. |
| 2015/0195259 A1 | 7/2015 | Liu et al. |
| 2015/0334435 A1 | 11/2015 | Shivadas et al. |
| 2016/0072870 A1 | 3/2016 | Watson et al. |
| 2016/0127440 A1 | 5/2016 | Gordon |
| 2016/0149981 A1 | 5/2016 | Shivadas et al. |
| 2016/0219303 A1 | 7/2016 | Braness et al. |
| 2017/0026712 A1 | 1/2017 | Gonder et al. |
| 2017/0041604 A1 | 2/2017 | Soroushian et al. |
| 2018/0241796 A1 | 8/2018 | Srinivasan et al. |

FOREIGN PATENT DOCUMENTS

| | | |
|---|---|---|
| CN | 1723696 | 1/2006 |
| EP | 757484 A2 | 2/1997 |
| EP | 813167 A2 | 12/1997 |
| EP | 0936812 A1 | 8/1999 |
| EP | 1056273 A2 | 11/2000 |
| EP | 1420580 A1 | 5/2004 |
| EP | 1553779 A1 | 7/2005 |
| EP | 1657835 A1 | 5/2006 |
| EP | 1718074 A1 | 11/2006 |
| EP | 2486727 A1 | 8/2012 |
| EP | 2507995 A1 | 10/2012 |
| EP | 2564354 A1 | 3/2013 |
| EP | 2616991 | 7/2013 |
| EP | 2617192 A2 | 7/2013 |
| EP | 2661696 A1 | 11/2013 |
| EP | 2716048 A1 | 4/2014 |
| EP | 2721826 A1 | 4/2014 |
| EP | 2486517 | 6/2014 |
| EP | 2751990 | 7/2014 |
| EP | 2807821 A2 | 12/2014 |
| EP | 2972960 A1 | 1/2016 |
| JP | 08046902 A | 2/1996 |
| JP | 8111842 A | 4/1996 |
| JP | 1996163488 | 6/1996 |
| JP | 08287613 A | 11/1996 |
| JP | 09037225 A | 2/1997 |
| JP | 11164307 A | 6/1999 |
| JP | 11275576 A | 10/1999 |
| JP | 11328929 A | 11/1999 |
| JP | 2000201343 A | 7/2000 |
| JP | 2001043668 A | 2/2001 |
| JP | 2001346165 A | 12/2001 |
| JP | 2002170363 A | 6/2002 |
| JP | 2002518898 A | 6/2002 |
| JP | 2002218384 A | 8/2002 |
| JP | 2003250113 A | 9/2003 |
| JP | 2004013823 A | 1/2004 |
| JP | 2004515941 A | 5/2004 |
| JP | 2004172830 A | 6/2004 |
| JP | 2004187161 A | 7/2004 |
| JP | 2004234128 A | 8/2004 |
| JP | 2005027153 | 1/2005 |
| JP | 2005080204 A | 3/2005 |
| JP | 2006524007 A | 10/2006 |
| JP | 2007036666 A | 2/2007 |
| JP | 2007174375 A | 7/2007 |
| JP | 2007235690 A | 9/2007 |
| JP | 2007535881 A | 12/2007 |
| JP | 2008235999 A | 10/2008 |
| JP | 2014506430 A | 3/2014 |
| JP | 6038805 B2 | 12/2016 |
| JP | 201763453 A | 3/2017 |
| KR | 100221423 B1 | 6/1999 |
| KR | 1020020064888 A | 8/2002 |
| KR | 669616 | 9/2007 |
| KR | 2002013664 | 2/2012 |

(56) References Cited

FOREIGN PATENT DOCUMENTS

| | | |
|---|---|---|
| KR | 20130133830 A | 12/2013 |
| WO | 1995015660 A1 | 6/1995 |
| WO | 1996013121 | 5/1996 |
| WO | 1997031445 A3 | 4/1998 |
| WO | 1999010836 A1 | 3/1999 |
| WO | 1999065239 A2 | 12/1999 |
| WO | 2001031497 A1 | 5/2001 |
| WO | 2001050732 A2 | 7/2001 |
| WO | 2001065762 A2 | 9/2001 |
| WO | 2002001880 A1 | 1/2002 |
| WO | 2002008948 A2 | 1/2002 |
| WO | 2002035832 A2 | 5/2002 |
| WO | 2002037210 A2 | 5/2002 |
| WO | 2002054196 A2 | 7/2002 |
| WO | 2004054247 A1 | 6/2004 |
| WO | 2004097811 A1 | 11/2004 |
| WO | 2004102571 A1 | 11/2004 |
| WO | 2006018843 A2 | 2/2006 |
| WO | 2006018843 A3 | 12/2006 |
| WO | 2007044590 A2 | 4/2007 |
| WO | 2007113836 A2 | 10/2007 |
| WO | 2008010275 A1 | 1/2008 |
| WO | 2008042242 A2 | 4/2008 |
| WO | 2007113836 A3 | 11/2008 |
| WO | 2009065137 A1 | 5/2009 |
| WO | 2010060106 A1 | 5/2010 |
| WO | 2010080911 A1 | 7/2010 |
| WO | 2010089962 A1 | 8/2010 |
| WO | 2010122447 A1 | 10/2010 |
| WO | 2010147878 A1 | 12/2010 |
| WO | 2011042898 A1 | 4/2011 |
| WO | 2011042900 A1 | 4/2011 |
| WO | 2011068668 A1 | 6/2011 |
| WO | 2011103364 A1 | 8/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |
| WO | 2012/094181 A2 | 7/2012 |
| WO | 2012/094189 A1 | 7/2012 |
| WO | 2012035534 A3 | 7/2012 |
| WO | 2012094171 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |
| WO | 2013032518 A2 | 3/2013 |
| WO | 2013103986 A2 | 7/2013 |
| WO | 2013111126 A2 | 8/2013 |
| WO | 2013111126 A3 | 8/2013 |
| WO | 2013032518 A3 | 9/2013 |
| WO | 2013144942 A1 | 10/2013 |
| WO | 2014063726 A1 | 5/2014 |
| WO | 2014145901 A1 | 9/2014 |
| WO | 2014193996 A2 | 12/2014 |
| WO | 2014193996 A3 | 2/2015 |
| WO | 2015031982 A1 | 3/2015 |
| WO | 2018152347 A1 | 8/2018 |

OTHER PUBLICATIONS

European Search Report for Application 11855237.1, search completed Jun. 12, 2014, 9 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
Informationweek: Front End: Daily Dose, "Internet on Wheels", Jul. 20, 1999, 3 pgs.
International Preliminary Report on Patentability for International Application PCT/US14/30747, Report dated Sep. 15, 2015, dated Sep. 24, 2015, 6 Pgs.
International Search Report and Written Opinion for International Application PCT/US2011/066927, International Filing Date Dec. 22, 2011, Report Completed Apr. 3, 2012, dated Apr. 20, 2012, 14 pgs.
International Search Report and Written Opinion for International Application PCT/US2011/067167, International Filing Date Dec. 23, 2011, Report Completed Jun. 19, 2012, dated Jul. 2, 2012, 11 pgs.
ITS International, "Fleet System Opts for Mobile Server", Aug. 26, 1999, 1 page.
Microsoft, Microsoft Media Platform: Player Framework, "Silverlight Media Framework v1.1", 2 pages.
Microsoft, Microsoft Media Platform:Player Framework, "Microsoft Media Platform: Player Framework v2.5 (formerly Silverlight Media Framework)", 2 pages.
The Official Microsoft IIS Site, Smooth Streaming Client, 4 pages.
International Search Report and Written Opinion for International Application PCT/US14/30747, report completed Jul. 30, 2014, dated Aug. 22, 2014, 7 Pages.
"Adaptive Streaming Comparison", Jan. 28, 2010, 5 pgs.
"Best Practices for Multi-Device Transcoding", Kaltura Open Source Video, 13 pgs.
"Netflix turns on subtitles for PC, Mac streaming", 3 pgs.
"Thread: SSME (Smooth Streaming Medial Element) config.xml review (Smooth Streaming Client configuration file)", 3 pgs.
"Transcoding Best Practices", From movideo, Nov. 27, 2013, 5 pgs.
"Using HTTP Live Streaming", iOS Developer Library, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pgs.
Akhshabi et al., "An Experimental Evaluation of Rate-Adaptation Algorithms in Adaptive Streaming over HTTP", MMSys'11, Feb. 24-25, 2011, 12 pgs.
"Method for the encoding of a compressed video sequence derived from the same video sequence compressed at a different bit rate without loss of data", ip.com, ip.com No. IPCOM000008165D, May 22, 2012, pp. 1-9.
Deutscher, "IIS Transform Manager Beta—Using the MP4 to Smooth Task", Retrieved from: https://web.archive.org/web/20130328111303/http://blogjohndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 15 pgs.
Inlet Technologies, "Adaptive Delivery to iDevices", 2 pages.
Inlet Technologies, "Adaptive delivery to iPhone 3.0", 2 pgs.
Inlet Technologies, "HTTP versus RTMP", 3 pages.
Inlet Technologies, "The World's First Live Smooth Streaming Event: The French Open", 2 pages.
Kurzke et al., "Get Your Content Onto Google TV", Google, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 20 pgs.
Levkov, "Mobile Encoding Guidelines for Android Powered Devices", Adobe Systems Inc., Addendum B, source and date unknown, 42 pgs.
MSDN, "Adaptive streaming, Expression Studio 2.0", 2 pgs.
Nelson, "Smooth Streaming Deployment Guide", Microsoft Expression Encoder, Aug. 2010, 66 pgs.
Noe, A. "Matroska File Format (under construction!)", Retrieved from the Internet: URL:http://web.archive.org web/20070821155146/www.matroska.org/technical/specs/matroska.pdf [retrieved on Jan. 19, 2011], Jun. 24, 2007, 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.

(56) References Cited

OTHER PUBLICATIONS

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Zambelli, Alex "IIS Smooth Streaming Technical Overview", Microsoft Corporation, Mar. 2009.
"Diagram | Matroska", Retrieved from the Internet: URL:http://web.archive.org/web/201 01217114656/http://matroska.org/technical/diagram/index.html, retrieved on Jan. 29, 2016, Dec. 17, 2010.
"Matroska Streaming | Matroska", Retrieved from the Internet: URL: http://web.archive.org/web/20101217114310/http://matroska.org/technical!streaming/index.html, retrieved on Jan. 29, 2016, Dec. 17, 2010.
"Specifications | Matroska", Retrieved from the Internet: URL:http://web.archive.org/web/20100706041303/http://www.matroska.org/technical/specs/index.html, retrieved on Jan. 29, 2016, Jul. 6, 2010.
U.S. Appl. No. 13/224,298, "Final Office Action Received", dated May 19, 2014, 27 pgs.
"Container format (digital)", printed Aug. 22, 2009 from http://en.wikipedia.org/wiki/Container_format_(digital), 4 pgs.
"DVD subtitles", sam.zoy.org/writings/dvd/subtitles, dated Jan. 9, 2001, printed Jul. 2, 2009, 4 pgs.
"DVD-Mpeg differences", http://dvd.sourceforge.net/dvdinfo/dvdmpeg.html, printed on Jul. 2, 2009, 1 pg.
"Final Committee Draft of MPEG-4 streaming text format", International Organisation for Standardisation, Feb. 2004, 22 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for . . . -a018239381, 6pg.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
I-O Data, Innovation of technology arrived, Retrieved from http://www.iodata.com/catalogs/AVLP2DVDLA_Flyer200505.pdf on May 30, 2013, 2 pgs.
"OpenDML AVI File Format Extensions", www.the-labs.com/Video/odmlff2-avidef.pdf, Authored by the OpenDML AVI M-JPEG File Format Subcommittee, Sep. 1997, 42 pgs.
"QCast Tuner for PS2", printed May 11, 2009 from http://web.archive.org/web/20030210120605/www.divx.com/software/detail.php?ie=39, 2 pgs.
"Text of ISO/IEC 14496-18/COR1", ITU Study Group 16—Video Coding Experts Group—ISO/IEC MPEG & ITU-T VCEG(ISO/IEC JTC1/SC29/WG11 and ITU-T SG16 06), No. N8664, Nov. 7, 2006.
"Text of ISO/IEC 14496-18/FDIS", ITU Study Group 16—Videocoding Experts Group—ISO/IEC MPEG & ITU-T VCEG(ISO/IEC JTC1/SC29/WG11 and ITU-T SG16 06), No. N6215, Jan. 7, 2004.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.

Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., printed Mar. 4, 2006, 15 pgs.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown), 6 pages.
Author Unknown, "Turbo-Charge Your Internet and PC Performance", printed Oct. 30, 2008 from Speedtest.net—The Global Broadband Speed Test, 1 pg.
Author Unknown, "When is 54 Not Equal to 54? A Look at 802.11a, b and g Throughput", printed Oct. 30, 2008 from www.oreillynet.com/pub/a/wireless/2003/08/08/wireless_throughput.html, 4 pgs.
Author Unknown, "White paper, The New Mainstream Wirless LAN Standard", Broadcom Corporation, Jul. 2, 2003, 12 pgs.
Blasiak, Ph.D., "Video Transrating and Transcoding: Overview of Video Transrating and Transcoding Technologies,", Ingenient Technologies, TI Developer Conference, Aug. 6-8, 2002, 22 pgs.
Casares et al., "Simplifying Video Editing Using Metadata", DIS2002, 2002, pp. 157-166.
CN200880127596.4, "Fourth Office Action", May 6, 2014, 8 pgs.
Garg et al., "An Experimental Study of Throughput for UDP and VoIP Traffic in IEEE 802.11b Networks", Wireless Communications and Networkings, Mar. 2003, pp. 1748-1753.
Kaspar et al., "Using HTTP Pipelining to Improve Progressive Download over Multiple Heterogeneous Interfaces", IEEE ICC proceedings, 2010, 5 pgs.
Kim, Kyuheon, "MPEG-2 ES/PES/TS/PSI", Kyung-Hee University, Oct. 4, 2010, 66 pages.
Kozintsev et al., "Improving last-hop multicast streaming video over 802.11", Workshop on Broadband Wireless Multimedia, Oct. 2004, pp. 1-10.
Long et al., "Silver: Simplifying Video Editing with Metadata", Demonstrations, CHI 2003: New Horizons, pp. 628-629.
Nelson, "Arithmetic Coding + Statistical Modeling = Data Compression: Part 1—Arithmetic Coding", Doctor Dobb's Journal, Feb. 1991, USA, pp. 1-12.
Nelson, Michael "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Noboru, Takematsu "Play Fast and Fine Video on Web! codec", Co.9 No. 12, Dec. 1, 2003, 178-179.
Noe, Alexander, "AVI File Format", http://www.alexander-noe.com/video/documentation/avi.pdf, pp. 1-26.
Noe, Alexander, "Definitions", http://www.alexander-noe.com/video/amg/definitions.html, Apr. 11, 2006, 2 pgs.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html, 7 pgs.
Pantos, "HTTP Live Streaming: draft-pantos-http-live-streaming-06", Published by the Internet Engineering Task Force (IETF), Mar. 31, 2011, 24 pages.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Phamdo, Nam, "Theory of Data Compression", printed from http://www.data-compression.com/theoroy.html on Oct. 10, 2003, 12 pgs.
Schulzrinne, H et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages (presented in two parts).

(56) References Cited

OTHER PUBLICATIONS

Tan, Yap-Peng et al., "Video transcoding for fast forward/reverse video playback", IEEE ICIP, 2002, pp. I-713 to I-716.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.
Unknown, "Entropy and Source Coding (Compression)", TCOM 570, Sep. 1999, pp. 1-22.
Wang et al., "Image Quality Assessment: From Error Visibility to Structural Similarity", IEEE Transactions on Image Processing, Apr. 2004, vol. 13, No. 4, pp. 600-612.
Wu et al., "Next Generation Mobile Multimedia Communications: Media Codec and Media Transport Perspectives", In China Communications, Oct. 2006, pp. 30-44.
"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pages.
"Information Technology-Coding of Audio Visual Objects—Part 2: Visual" International Standard, ISO/IEC 14496-2, Third Edition, Jun. 1, 2004, pp. 1-724 (presented in three parts).
"OpenDML AVI File Format Extensions," Sep. 1997, Version 1.02, XP-002179318, OpenDML AVI M-JPEG File Format Subcommittee, 42 pgs.
Broadq—The Ultimate Home Entertainment Software, printed May 11, 2009 from ittp://web.srchive.org/web/20030401122010/www.broadq.com/qcasttuner/,1 pg.
Cloakware Corporation, "Protecting Digital Content Using Cloakware Code Transformation Technology", Version 1.2, May 2002, pp. 1-10.
EP10821672 EESR, completed Jan. 30, 2014, 3 pgs.
EP11824682 EESR, completed Feb. 6, 2014. 4 pgs.
European Search Report Application No. EP 08870152, Search Completed May 19, 2011, dated May 26, 2011, 9 pgs.
European Search Report for Application 11855103.5, search completed Jun. 26, 2014, 9 pgs.
European Supplementary Search Report for Application EP09759600, completed Jan. 25, 2011, 11 pgs.
Extended European Search Report for European Application No. 14763140.2, Search completed Sep. 26, 2016, dated Oct. 5, 2016, 9 Pgs.
Supplementary European Search Report for Application No. EP 04813918, Search Completed Dec. 19, 2002, 3 pgs.
Supplementary European Search Report for Application No. EP 10729513, International Filing Date Jan. 7, 2010, Search Completed Dec. 9, 2013, 4 pgs.
Supplementary European Search Report for EP Application 11774529, completed Jan. 31, 2014, 2 pgs.
Supplementary European Search Report for Application No. EP 10834935, International Filing Date Nov. 15, 2010, Search Completed May 27, 2014, 9 pgs.
Griffith, Eric, "The Wireless Digital Picture Fram Arrives", printed May 4, 2007 from Wi-Fi Planet at http://www.wi-fiplanet.com/news/article.php/3093141, Oct. 16, 2003, 3 pgs.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
International Preliminary Report on Patentability for International Application No. PCT/US2011/068276, dated Mar. 4, 2014, 23 pgs.
International Preliminary Report on Patentability for International Application PCT/US2013/043181, Report dated Dec. 31, 2014, dated Jan. 8, 2015, 11 Pgs.
International Preliminary Report on Patentability for International Application PCT/US2014/039852 , Report dated Dec. 1, 2015, dated Dec. 5, 2015, 8 Pgs.
International Search Report and Written Opinion for International Application No. PCT/US08/87999, completed Feb. 7, 2009, dated Mar. 19, 2009, 6 pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2004/041667, Completed May 24, 2007, dated Jun. 20, 2007, 6 pgs.
International Search Report and Written Opinion for International Application No. PCT/US2005/025845, completed Feb. 5, 2007 and dated May 10, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2010/56733, Completed Jan. 3, 2011, dated Jan. 14, 2011, 9 pgs.
International Search Report and Written Opinion for International Application No. PCT/US2013/043181, Completed Nov. 27, 2013, dated Dec. 6, 2013, 12 pgs.
International Search Report and Written Opinion for International Application PCT/US14/39852, Report Completed Oct. 21, 2014, dated Dec. 5, 2014, 11 pgs.
International Search Report and Written Opinion for International Application PCT/US2011/068276, completed Jun. 19, 2013, dated Jul. 8, 2013, 24 pgs.
International Search Report and Written Opinion for PCT/US2013/020572, International Filing Date Jan. 7, 2013, Search Completed Mar. 19, 2013, dated Apr. 29, 2013, 10 pgs.
International Search Report for International Application No. PCT/US07/63950, completed Feb. 19, 2008; dated Mar. 19, 2008, 9 pgs.
International Search Report and Written Opinion for International Application PCT/US2010/020372, completed Feb. 10, 2009, Search Report dated Mar. 1, 2010, 7 pgs.
10 KISS Players, "KISS DP-500", retrieved from http://www.kiss-technology.com/?p=dp500 on May 4, 2007, 1 pg.
Lifehacker—Boxqueue Bookmarklet Saves Videos for Later Boxee Watching, printed Jun. 16, 2009 from http://feeds.gawker.com/~r/lifehacker/full/~3/OHvDmrIgZZc/boxqueue-bookmarklet-saves-videos-for-late-boxee-watching, 2 pgs.
Linksys Wireless—B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Linksys®: "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p, 4 pgs.
Microsoft Corporation, "Chapter 8, Multimedia File Formats" 1991, Microsoft Windows Multimedia Programmer's Reference, 3 cover pgs., pp. 8-1 to 8-20.
Microsoft Windows® XP Media Center Edition 2005, "Frequently asked Questions", printed May 4, 2007 from http://www.microsoft.com/windowsxp/mediacenter/evaluation/faq.mspx, 6 pgs.
Microsoft Windows® XP Media Center Edition 2005, "Features", printed May 9, 2007, from http://www.microsoft.com/windowsxp/mediacenter/evaluation/features.mspx, 4 pgs.
Morrison, "EA IFF 85" Standard for Interchange Format Files, Jan. 14, 1985, printed from http://www.dcs.ed.ac.uk/home/mxr/gfx/2d/IFF.txt on Mar. 6, 2006, 24 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
Open DML AVI-M-JPEG File Format Subcommittee, "Open DML AVI File Format Extensions", Version 1.02, Feb. 28, 1996, 29 pgs.
Pcworld.com, "Future Gear: PC on the HiFi, and the TV", from http://www.pcworld.com/article/id,108818-page,1/article.html, printed May 4, 2007, from IDG Networks, 2 pgs.
"QTV—About BroadQ", printed May 11, 2009 from http://www.broadq.com/en/about.php, 1 pg.

(56) References Cited

OTHER PUBLICATIONS

Taxan, "A Vel LinkPlayer2 for Consumer, I-O Data USA—Products—Home Entertainment", printed May 4, 2007 from http://www.iodata.com/usa/products/products.php?cat=HNP&sc=AVEL&pld=AVLP2/DVDLA&ts=2&tsc, 1 pg.

Windows Media Center Extender for Xbox, printed May 9, 2007 from http://www.xbox.com/en-US/support/systemuse/xbox/console/mediacenterextender.htm, 2 pgs.

Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.

International Preliminary Report for Application No. PCT/US2011/066927, Report dated Jul. 10, 2013, 13 pgs.

International Search Report and Written Opinion for International Application No. PCT/US2018/018399, Search completed Apr. 4, 2018, dated Apr. 25, 2018, 28 Pgs.

Adhikari et al., "Unreeling Netflix: Understanding and Improving Multi-CDN Movie Delivery", INFOCOM, 2012 Proceedings IEEE, 2012, 9 pgs.

Martin et al, "Characterizing Netflix Bandwidth Consumption", In CCNC, 2013, 6 pgs.

Martin et al, "Characterizing Netflix Bandwidth Consumption", Presented at IEEE CCNC 2013 on Jan. 13, 2013, 21 pgs.

\* cited by examiner

SYSTEMS, METHODS, AND MEDIA FOR DELIVERY OF CONTENT

BACKGROUND OF THE INVENTION

Consumers increasingly have the option to stream live media content over the Internet. When content is streamed live, fragments of the content are provided to user equipment devices as the content is being created. These fragments are rendered by the user equipment devices as they arrive, permitting consumers to observe events, such as sports games, as the events develop. Live Internet streaming may be advantageous because it may give consumers access to kinds of programming that were until recently strictly in the domain of traditional television and radio broadcasting.

Streaming of live media content may be more technically challenging than non-live content streaming. Because live content is rendered at approximately the same time as it is captured, live content cannot be buffered for prolonged periods of time. The lack of extensive buffering in live content streaming may cause live content streaming to require greater network bandwidth and/or smaller network latency than non-live content streaming.

Accordingly, the need exists for new methods, systems, and media for delivery of content that are capable of satisfying the bandwidth and latency requirements of live content streaming while still being suitable for streaming non-live content.

SUMMARY OF THE INVENTION

Systems, methods, and media for delivery of content are provided. In some embodiments, systems for controlling delivery of content are provided, the systems comprising processing circuitry configured to: receive a request to stream the content, the request being received from a user equipment device; determine a first location of the user equipment device; determine a count of user equipment devices that are located at the first location and are currently streaming the content; determine whether the count meets a threshold; and responsive to determining that the count meets the threshold, add a first content delivery network to a pool of one or more content delivery networks that are used to stream the content.

In some embodiments, methods for delivery of content are provided, the methods comprising: receiving a request to stream the content, the request being received from a user equipment device; determining a first location of the user equipment device; determining a count of user equipment devices that are located at the first location and are currently streaming the content; determining whether the count meets a threshold; and responsive to determining that the count meets the threshold, adding, by processing circuitry, a first content delivery network to a pool of one or more content delivery networks that are used to stream the content.

In some embodiments, non-transitory computer-readable media that contain computer-executable instructions which, when executed by a processor, cause the processor to perform a method for delivery of content are provided, the method comprising: receiving a request to stream the content, the request being received from a user equipment device; determining a first location of the user equipment device; determining a count of user equipment devices that are located at the first location and are currently streaming the content; determining whether the count meets a threshold; and responsive to determining that the count meets the threshold, adding a first content delivery network to a pool of one or more content delivery networks that are used to stream the content.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

This invention generally relates to systems, methods, and media for controlling delivery of content. In some embodiments, mechanisms (which can be systems, methods, media, etc.) are provided for controlling the distribution of media content that is delivered to user equipment devices by a pool of one or more content distribution networks (CDNs). In some embodiments, a count of user equipment devices that are streaming content from a particular location can be monitored and, when the count exceeds a predetermined threshold, a new content distribution network can be added to the pool.

As referred to herein, the term "media content" or "content" should be understood to mean one or more electronically consumable media assets, such as television programs, pay-per-view programs, on-demand programs (e.g., as provided in video-on-demand (VOD) systems), Internet content (e.g., streaming content, downloadable content, Webcasts, etc.), movies, films, video clips, audio, audio books, and/or any other media or multimedia and/or combination of the same. As referred to herein, the term "multimedia" should be understood to mean media content that utilizes at least two different content forms described above, for example, text, audio, images, video, or interactivity content forms. Media content may be recorded, played, displayed or accessed by user equipment devices, but can also be part of a live performance. In some embodiments, media content can include over-the-top (OTT) content. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC.

Media content can be provided from any suitable source in some embodiments. In some embodiments, media content can be electronically delivered to a user's location from a remote location. For example, media content, such as a Video-On-Demand movie, can be delivered to a user's home from a cable system server. As another example, media content, such as a television program, can be delivered to a user's home from a streaming media provider over the Internet.

Figure 1:
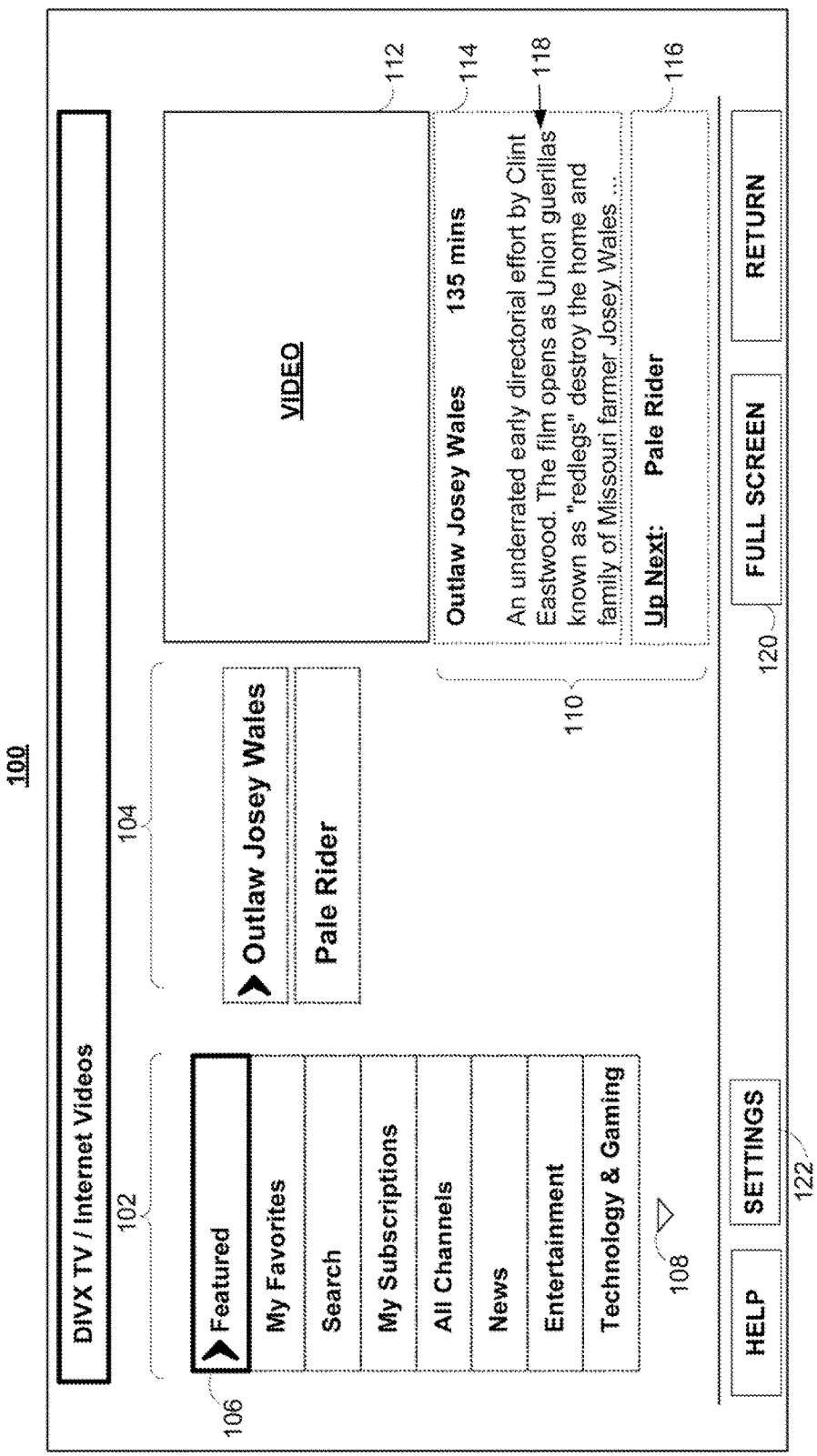
FIG. 1 shows an example of an interactive media guidance application display that can be used with a process for selecting media content for presentation in accordance with some embodiments of the invention.

FIG. 1 shows an example 100 of a guidance display that can be provided as part of an interactive media guidance application in accordance with some embodiments. As illustrated, a user may be presented with display 100 in response to the user selecting a selectable option provided in a displayed menu (e.g., an "Internet Videos" option, a "DivXTV" option, a "Program Listings" option, etc.), pressing a dedicated button (e.g., a GUIDE button) on a user input interface or device, and/or taking any other suitable action.

As illustrated in FIG. 1, guidance display 100 may include lists of media identifiers, such as a first list of media identifiers 102 that lists categories of media content, and a second list of media identifiers 104 that lists particular pieces of media content within a selected category that are available for presentation.

Additional media guidance data, such as additional media identifiers, may be presented in response to a user selecting a navigational icon 108.

Display 100 may also include a media queue region 110 that lists one or more pieces of media content selected and queued for playback, and a video region 112 in which pieces of media content can be presented.

In some embodiments, information relating to a piece of media content can also be presented to a user. For example, information 118 can include a name of a piece of media content, a time at which the media content is available (if applicable), a source (e.g., channel, Web address, etc.) from which the media content can be obtained, a parental rating for the piece of media content, a duration of the piece of media content, a description of the piece of media content, a review or a quality rating of the piece of media content, and/or any other suitable information.

In some embodiments, pieces of media content can be played in a full sized display screen in response to a user selecting "full screen" button 120.

In some embodiments, a user may be able to set settings related to the interactive media guidance application by pressing a settings button, such as settings button 122 of FIG. 1. The settings that can be set can include any suitable settings such as channel and program favorites, programming preferences that the guidance application can utilize to make programming recommendations, display preferences, language preferences, and/or any other suitable settings.

Figure 2:
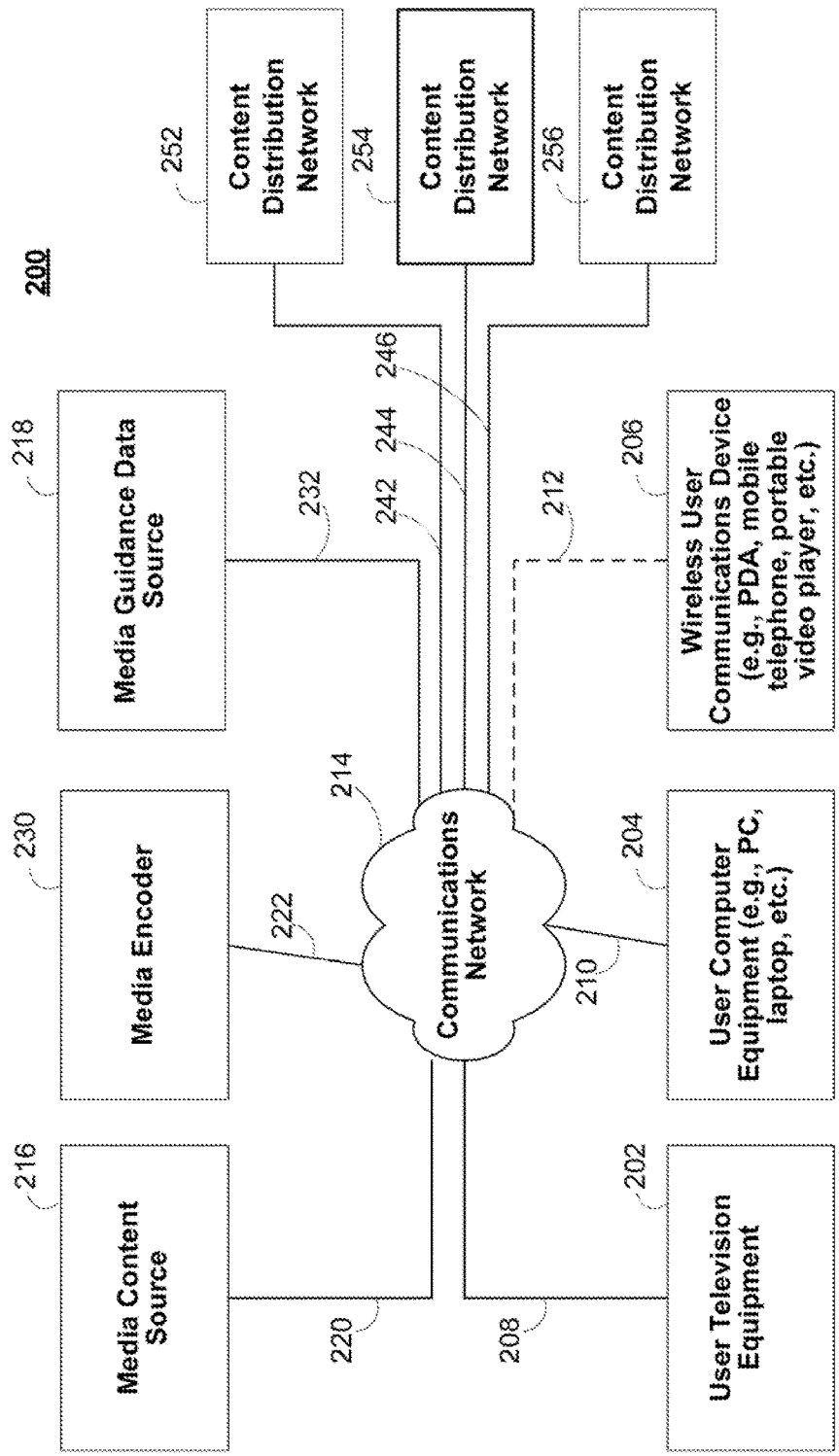
FIG. 2 shows an example of a block diagram of hardware that can be used in accordance with some embodiments of the invention.

Turning to FIG. 2, an example 200 of architecture of hardware that can be used in accordance with some embodiments is shown. As illustrated, architecture 200 can include a user television equipment device 202, a user computer equipment device 204, a wireless user communication device 206, a communications network 214, a media content source 216, a media guidance data source 218, a media encoder 230, content distribution networks (CDNs) 252, 254, and 256, and communication paths 208, 210, 212, 220, 222, 232, 242, 244, and 246, in some embodiments.

In some embodiments, user television equipment device 202, user computer equipment device 204, and wireless user communication device 206, which can each be referred to herein as a "user equipment device," can be any suitable devices for presenting media content, presenting an interactive media guidance application for selecting content, and/or performing any other suitable functions as described herein.

User television equipment device 202 can be any suitable user television equipment device or devices in some embodiments. For example, in some embodiments, user television equipment device 202 can include any suitable television, smart TV, set-top box, integrated receiver decoder (IRD) for handling satellite television, digital storage device, digital media receiver (DMR), digital media adapter (DMA), streaming media device, DVD player, DVD recorder, connected DVD, local media server, BLU-RAY player, BLU-RAY recorder, any other suitable user television equipment, and/or any other suitable combination of the same.

User computer equipment 204 can be any suitable user computer equipment in some embodiments. For example, in some embodiments, user computer equipment 204 can include any suitable personal computer (PC), laptop computer, tablet computer, WebTV box, personal computer television (PC/TV), PC media server, PC media center, hand-held computer, stationary telephone, non-portable gaming machine, any other suitable user computer equipment, and/or any other suitable combination of the same.

Wireless user communication device 206 can be any suitable wireless user communication device or devices in some embodiments. For example, in some embodiments, wireless user communication device 206 can include any suitable personal digital assistant (PDA), mobile telephone, portable video player, portable music player, portable gaming machine, smart phone, any other suitable wireless device, and/or any suitable combination of the same.

In some embodiments, user equipment devices may be connectable to a communications network. For example, in some embodiments, user equipment devices may be Internet-enabled allowing them to access Internet media content.

In some embodiments, communications network 214 may be any one or more networks including the Internet, a mobile phone network, a mobile voice network, a mobile data network (e.g., a 3G, 4G, or LTE network), a cable network, a satellite network, a public switched telephone network, a local area network, a wide area network, a wireless network (e.g., WiFi, WiMax, etc.), any other suitable type of communications network, and/or any suitable combination of communications networks.

Media content source 216 may include one or more types of content distribution equipment for distributing any suitable media content, including television distribution facility equipment, cable system head-end equipment, satellite distribution facility equipment, programming source equipment (e.g., equipment of television broadcasters, such as NBC, ABC, HBO, etc.), intermediate distribution facility equipment, Internet provider equipment, on-demand media server equipment, live media distribution equipment, cameras, and/or any other suitable media content provider equipment, in some embodiments. NBC is a trademark owned by the National Broadcasting Company, Inc., ABC is a trademark owned by the American Broadcasting Companies, Inc., and HBO is a trademark owned by the Home Box Office, Inc.

Media content source 216 may be operated by the originator of content (e.g., a television broadcaster, a Webcast provider, etc.) or may be operated by a party other than the originator of content (e.g., an on-demand content provider, an Internet provider of content of broadcast programs for downloading, etc.), in some embodiments.

Media content source 216 may be operated by cable providers, satellite providers, on-demand providers, Internet providers, providers of over-the-top content, subscription providers, rental providers, and/or any other suitable provider(s) of content, in some embodiments.

Media content source 216 may include a remote media server used to store different types of content (including video content selected by a user), in a location remote from any of the user equipment devices, in some embodiments. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide any suitable media guidance data, such as names of pieces of media content, times at which the media content is available (if applicable), sources (e.g., channels, Web addresses, etc.) from which the media content can be obtained, parental ratings for the pieces of media content, durations of the pieces of media content, descriptions of the pieces of media content, reviews or quality ratings of the pieces of media content, and/or any other suitable information, in some embodiments.

Media guidance data may be provided by media guidance data source 218 to the user equipment devices using any suitable approach, in some embodiments. In some embodiments, for example, an interactive media guidance application may be a stand-alone interactive television program guide that receives this media guidance data from media guidance data source 218 via a data feed (e.g., a continuous feed or trickle feed). In some embodiments, this media guidance data may be provided to the user equipment on a television channel sideband, using an in-band digital signal, using an out-of-band digital signal, or by any other suitable data transmission technique from media guidance data source 218. In some embodiments, this media guidance data may be provided to user equipment on multiple analog or digital television channels from media guidance data source 218. In some embodiments, media guidance data from media guidance data source 218 may be provided to users' equipment using a client-server approach, wherein media guidance data source 218 acts as a server.

In some embodiments, media guidance data source 218 may manage a pool of one or more content delivery networks (CDNs) that are used to deliver content to a plurality of user equipment devices. More particularly, in some embodiments, media guidance data source 218 may maintain a list of the CDNs from the pool and make changes to the list as CDNs are added or removed from the pool. When a CDN is added to the pool by media guidance source 218, or periodically, media guidance data source 218 may provide the list to media encoder 230.

In some embodiments, media guidance data source 218 may maintain records relating to the geographic distribution of user equipment devices that are currently streaming the content. For example, media guidance data source 218 may maintain a record that indicates a plurality of locations along with a count of user equipment devices located at each of the locations that are currently streaming the media content. In some embodiments, any one of the locations in the record may be indicated by: an identifier of a geographic location; an identifier of a network; an identifier of a network domain; an item of information that is found in a Domain Name Service (DNS) record; and/or any other suitable identifier.

Media encoder 230 may receive live content from media content source 216 and encode fragments of the content using a media encoding algorithm. Each fragment may be of any suitable duration, such as 2-10 seconds. In addition, each fragment may be encoded into one or more media files. In some embodiments, each fragment may be encoded into multiple media files that have different bit encoding rates.

Media encoder 230 may provide the media files corresponding to each fragment of the media content to each one of the pool of CDNs that are used to deliver the media content to user equipment devices. In some embodiments, media encoder 230 may identify the CDNs by obtaining the list maintained by media guidance data source 218. In some embodiments, the media files may be uploaded to the CDNs in the pool over a File Transfer Protocol (FTP) connection and/or any other suitable mechanism. Additionally or alternatively, in some embodiments, media encoder 230 may obtain a current copy of the list of CDNs before uploading media files that correspond to a fragment of the content. Doing so may cause any changes made to the pool of CDNs by media guidance data source 218 to take place immediately.

After the upload of a set of media files that correspond to a fragment of the media content is completed, media encoder 230 may provide a set of addresses to media guidance data source 218. Each address in the set may be the address of one of the media files at one of the CDN's in the pool. Each address in the set may be usable to retrieve a media file from the address' respective CDN. Addresses from the set may be later communicated by media guidance data source 218 to user equipment devices that seek to stream the media content. The user equipment devices may use these addresses to obtain the CDNs in the pool.

Content delivery network (CDN) 252 may distribute content to user equipment devices 202, 204, and/or 206. CDN 252 may include: load balancing servers; request servers: cache servers; storage servers; communications switches; gateways; and/or any other suitable equipment. In some embodiments, CDN 252 may include a cloud-based storage that includes virtualized pools of storage hosted in an Internet data center, such as the Amazon S3 storage provided by Amazon Web Services of Herndon, Va., USA. In some embodiments, the cloud based storage may be used to "locally" cache media content for presentation on user equipment devices 202, 204, and/or 206. Any suitable type and/or number of equipment may be used to implement CDN 252, in some embodiments.

CDN 252 may use an adaptive bit rate (ABR) technique in which content is encoded into fragments (e.g., 2-10 seconds in length) that have different bit encoding rates. Having fragments of different bit encoding rates permits CDN 252 to dynamically select the proper bit-rate for user equipment devices depending on the networking resources available to any of the devices. In live content streaming, the fragments may be provided to client devices in real-time or near-real time as they are generated. As noted above, the fragments may be obtained from media encoder 230.

CDN 254 and CDN 256 may have similar structures to CDN 252. Each CDN may include a different plurality of computing devices (e.g., load balancers, cache servers, or storage servers). Additionally or alternatively, each CDN may be implemented by using a different data center. In some embodiments, CDNs 252, 254, and 256 may have different geographic locations from one another.

In some embodiments, each of CDN 252, 254 and 256 may be operated by third-party operators that deliver content on behalf of the operators of media content source 216 and/or media guidance data source 218. Each CDN may be associated with a different price that the operator of the CDN charges for the delivery of the media content. The price may be structured in terms of: dollars per amount of data served; dollars per amount of bandwidth that is made available to serve the content; dollars per amount of bandwidth that is consumed; and/or in accordance with any other suitable pricing scheme.

Although only one each of user equipment devices 202, 204, and/or 206, sources 216 and 218, media encoder 230, and CDNs 252, 254, and 256 are illustrated in FIG. 2 in order to avoid over complicating the drawing, any suitable number of each of these components can be provided in some embodiments.

Each user may utilize more than one type of user equipment device in some embodiments. In some embodiments, any of user equipment devices 202, 204, and 206 can be combined, and any of media content source, media encoder 230, and media guidance data source 218 may be combined.

Paths 208, 210, 212, 220, 222, 232, 242, 244, and 246 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths, in some embodiments. Path 212 is drawn with dotted lines to indicate that, in the example embodiment shown in FIG. 2, it can be a wireless path (although this path may be a wired path, if desired), and paths 208, 210, 220, 222, and 232 are drawn as solid lines to indicate they can be wired paths (although these paths may be wireless paths, if desired). In some embodiments, communication to/from user equipment devices 202, 204, and 206, sources 216 and 218, media encoder 230, and CDNs 252, 254, and 256 may be provided by one or more of communications paths 208, 210, 212, 220, 222, and 232, respectively, but are shown as a single path in FIG. 2 to avoid overcomplicating the drawing.

Although direct communications paths are not drawn between user equipment devices 202, 204, and 206, and between sources 216 and 218, media encoder 230, and CDNs 252, 254, and 256, these components may communicate directly with each other via communication paths, such as those described above, as well via point-to-point communication paths, such as USB cables, IEEE 1394 cables, wireless paths (e.g., Bluetooth, infrared, IEEE 802.11x, etc.), or other communication via wired or wireless paths, in some embodiments. BLUETOOTH is a certification mark owned by Bluetooth SIG, INC. The user equipment devices 202, 204, and 206, sources 216 and 218, media encoder 230, and CDNs 252, 254, and 256 may also communicate with each other directly through an indirect path via communications network 214, in some embodiments.

In some embodiments, sources 216 and 218 and media encoder 230 can be implemented in any suitable hardware. For example, sources 216 and 218 and media encoder 230 can be implemented in any of a general purpose device such as a computer or a special purpose device such as a client, a server, a mobile terminal (e.g., a mobile phone), etc. Any of these general or special purpose devices can include any suitable components such as a hardware processor (which can be a microprocessor, a digital signal processor, a controller, etc.). Furthermore, as noted above, any of media encoder 230 and sources 218 and 216 may be integrated as a single device (e.g., a single computer) and/or a single distributed system.

Figure 3:
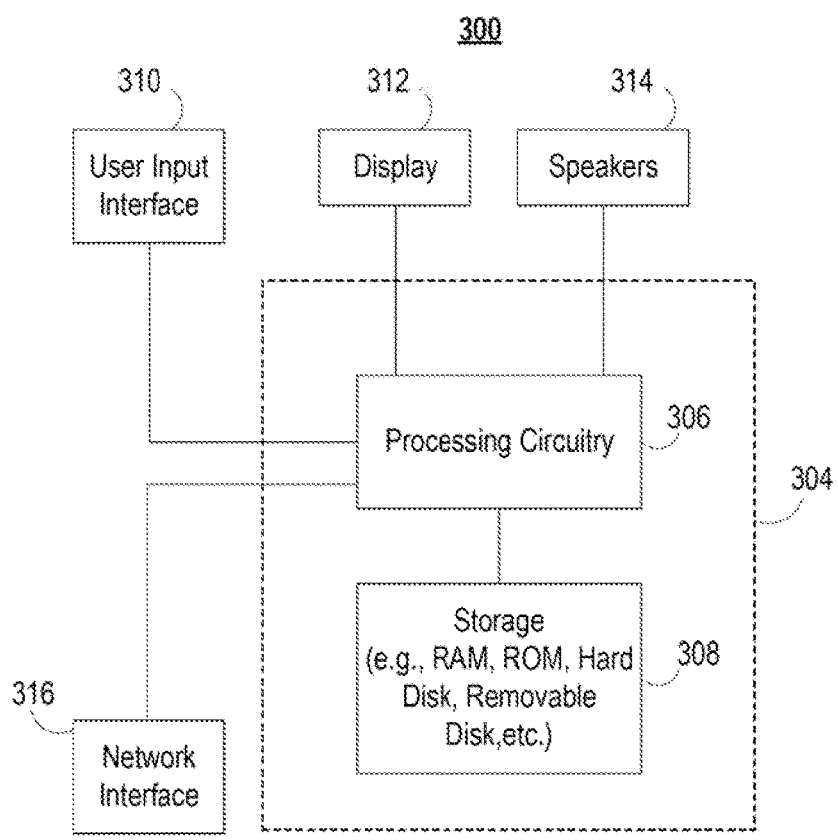
FIG. 3 shows an example of a block diagram of user equipment device hardware that can be used in accordance with some embodiments of the invention.

FIG. 3 shows an example of hardware that can be provided in an illustrative user equipment device 300, such as user television equipment device 202, user computer equipment device 204, and/or wireless user communication device 206 of FIG. 2, in accordance with some embodiments. As illustrated, device 300 can include control circuitry 304 (which can include processing circuitry 306 and storage 308), a user input interface 310, a display 312, speakers 314, and an input/output (hereinafter "I/O") interface 316, in some embodiments.

Control circuitry 304 may include any suitable processing circuitry such as processing circuitry 306. As referred to herein, processing circuitry 306 can be circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Storage 308 can be any suitable digital storage mechanism in some embodiments. For example, storage 308 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions), in some embodiments. Cloud-based storage may be used to supplement storage 308 or instead of storage 308 in some embodiments.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits, in some embodiments. Encoding circuitry (e.g., for converting over-the-air, analog, or digital signals to MPEG signals for storage) may also be provided, in some embodiments. Control circuitry 304 may also include scaler circuitry for upconverting and downconverting content into the preferred output format of the user equipment 300, in some embodiments. Circuitry 304 may also include digital-to-analog converter circuitry and analog-to-digital converter circuitry for converting between digital and analog signals. The video generating circuitry may be used for presenting media content, in some embodiments. The tuning and encoding circuitry may be used by the user equipment device to receive and to display, to play, or to record content, in some embodiments. The tuning and encoding circuitry may also be used to receive guidance data, in some embodiments. The circuitry described herein, including for example, the tuning, video generating, encoding, decoding, encrypting, decrypting, scaler, and analog/digital circuitry, may be implemented using software running on one or more general purpose or special purpose hardware processors, in some embodiments. Multiple tuners may be provided to handle simultaneous tuning functions (e.g., watch and record functions, picture-in-picture (PIP) functions, multiple-tuner recording, etc.), in some embodiments. If storage 308 is provided as a separate device from user equipment 300, the tuning and encoding circuitry (including multiple tuners) may be associated with storage 308, in some embodiments.

A user may send instructions to control circuitry 304 using user input interface 310, in some embodiments. User input interface 310 may be any suitable user interface, such as a remote control, mouse, trackball, keypad, keyboard, touch screen, touchpad, stylus input, joystick, voice recognition interface, or other user input interfaces, in some embodiments.

Display 312 may be provided as a stand-alone device or integrated with other elements of user equipment device 300, in some embodiments. Display 312 may be one or more of a monitor, a television, a liquid crystal display (LCD) for a mobile device, or any other suitable equipment for displaying visual images, in some embodiments. In some embodiments, display 312 may be HDTV-capable. In some embodiments, display 312 may be a 3D display.

A video card or graphics card may generate the output to display 312, in some embodiments. The video card may offer various functions such as accelerated rendering of 3D scenes and 2D graphics, MPEG-2/MPEG-4 decoding, TV output, or the ability to connect multiple monitors, in some embodiments. The video card may be any processing circuitry described above in relation to control circuitry 304, in some embodiments. The video card may be integrated with the control circuitry 304 or may be integrated with display 312, in some embodiments.

Speakers 314 may be provided as integrated with other elements of user equipment device 300 or may be stand-alone units, in some embodiments. The audio component of media content displayed on display 312 may be played through speakers 314, in some embodiments. In some embodiments, the audio may be distributed to a receiver (not shown), which processes and outputs the audio via speakers 314.

I/O interface 316 can be any suitable I/O interface 316 in some embodiments. For example, in some embodiments, I/O interface 316 can be any suitable interface for coupling control circuitry 304 (and specifically processing circuitry 306) to one or more communications paths (e.g., paths 208, 210, and 212 described in FIG. 2). More particularly, for example, I/O interface 316 can include a cable modem, an integrated services digital network (ISDN) modem, a digital subscriber line (DSL) modem, a telephone modem, an Ethernet card, a fiber-optic modem, a wireless modem, and/or any other suitable communications circuitry. In some embodiments, the I/O interface can be used to provide content and data from an external location to device 300. For example, in some embodiments, I/O interface 316 can be used to provide media content (e.g., broadcast programming, on-demand programming, Internet content, content available over a local area network (LAN) or wide area network (WAN), and/or any other suitable content), media guidance data, subtitles, time codes, and/or any other suitable information or data to control circuitry 304 of device 300. In some embodiments, I/O interface 316 can also be used to send and receive commands, requests, and other suitable data from and to, respectively, control circuitry 304. Any suitable number of I/O interfaces 316 can be provided, even though only one is shown in FIG. 3 to avoid overcomplicating the drawing.

The processes for playing back media content, the interactive media guidance application and/or any other suitable functions as described herein may be implemented as stand-alone applications on user equipment devices in some embodiments. For example, the processes for playing back media content and/or the interactive media guidance application may be implemented as software or a set of executable instructions which may be stored in storage 308, and executed by control circuitry 304 of a user equipment device 300.

In some embodiments, the processes for playing back media content, the interactive media guidance application, and/or any other suitable functions as described herein may be implemented as client-server applications. In such client-server applications, a client application may reside on a user equipment device, and a server application may reside on a remote server, such as source 216 or one of CDNs 252, 254, and 256. For example, the processes for playing back media content may be implemented partially as a client application on control circuitry 304 of user equipment device 300 and partially as a server application on media content source 216 or one of CDNs 252, 254, and 256. As another example, an interactive media guidance application may be implemented partially as a client application on control circuitry 304 of user equipment device 300 and partially on a remote server (e.g., media guidance data source 218 or one of CDNs 252, 254, and 256) as a server application running on control circuitry of the remote server.

Figure 4:
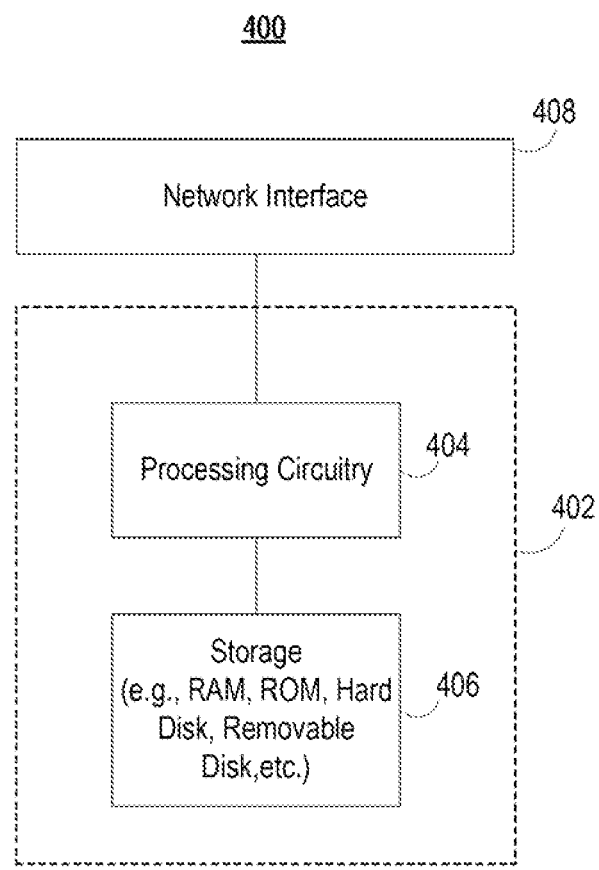
FIG. 4 shows an example of a block diagram of server hardware that can be used in accordance with some embodiments of the invention.

FIG. 4 shows an example of hardware that can be provided in an illustrative server 400. Server 400 may be part of a media guidance data source, such as media guidance data source 218, and it may implement a media content delivery process, such as at least portions of content delivery process 500, which is shown in FIG. 5. As illustrated, server 400 can include control circuitry 402 (which can include processing circuitry 404 and storage 406) and a network interface 408.

Control circuitry 402 may include any suitable processing circuitry such as processing circuitry 404. As referred to herein, processing circuitry 404 can be circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Storage 406 can be any suitable digital storage mechanism in some embodiments. For example, storage 406 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 406 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions). Cloud-based storage may be used to supplement storage 406 or instead of storage 406 in some embodiments.

Control circuitry 402 may include encoding circuitry for encoding media content (e.g., video or audio). Control circuitry 402 may also include adaptive bit streaming circuitry for encoding the media content into multiple bit rates and performing switches between the streams during normal playback based upon the streaming conditions. Control circuitry 402 may also include streaming circuitry for transmitting the different bit streams via network interface 408.

For example, in some embodiments, interface 408 can be any suitable interface for coupling control circuitry 402 (and specifically processing circuitry 404) to one or more communications networks. More particularly, for example, interface 408 can include a cable modem, an integrated services digital network (ISDN) modem, a digital subscriber line (DSL) modem, a telephone modem, an Ethernet card, a fiber-optic modem, a wireless modem, and/or any other suitable communications circuitry. In some embodiments, the I/O interface can be used by server 400 to stream content to a client device, such as device 300. More particularly, in some embodiments, interface 408 can be used to provide media content (e.g., broadcast programming, on-demand programming, Internet content, content available over a local area network (LAN) or wide area network (WAN), and/or any other suitable content). In some embodiments, interface 408 can also be used to receive commands, requests, from a client device. Such requests may be for blocks (e.g., chunks) of media content that is being streamed.

Figure 5A:
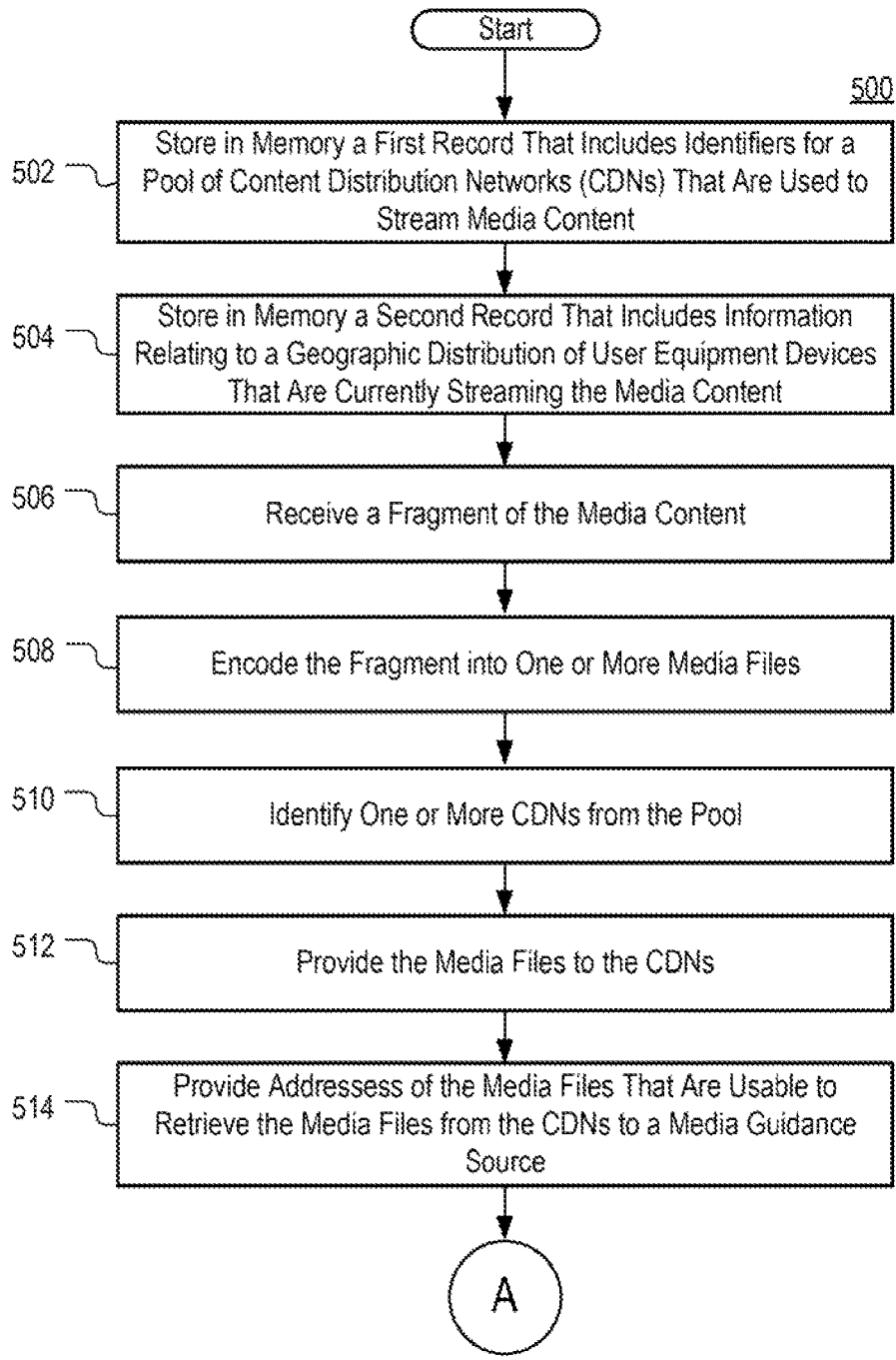
FIGS. 5A and 5B show an example of a flow diagram of a process for delivery of content, in accordance with some embodiments of the invention.
Figure 5B:
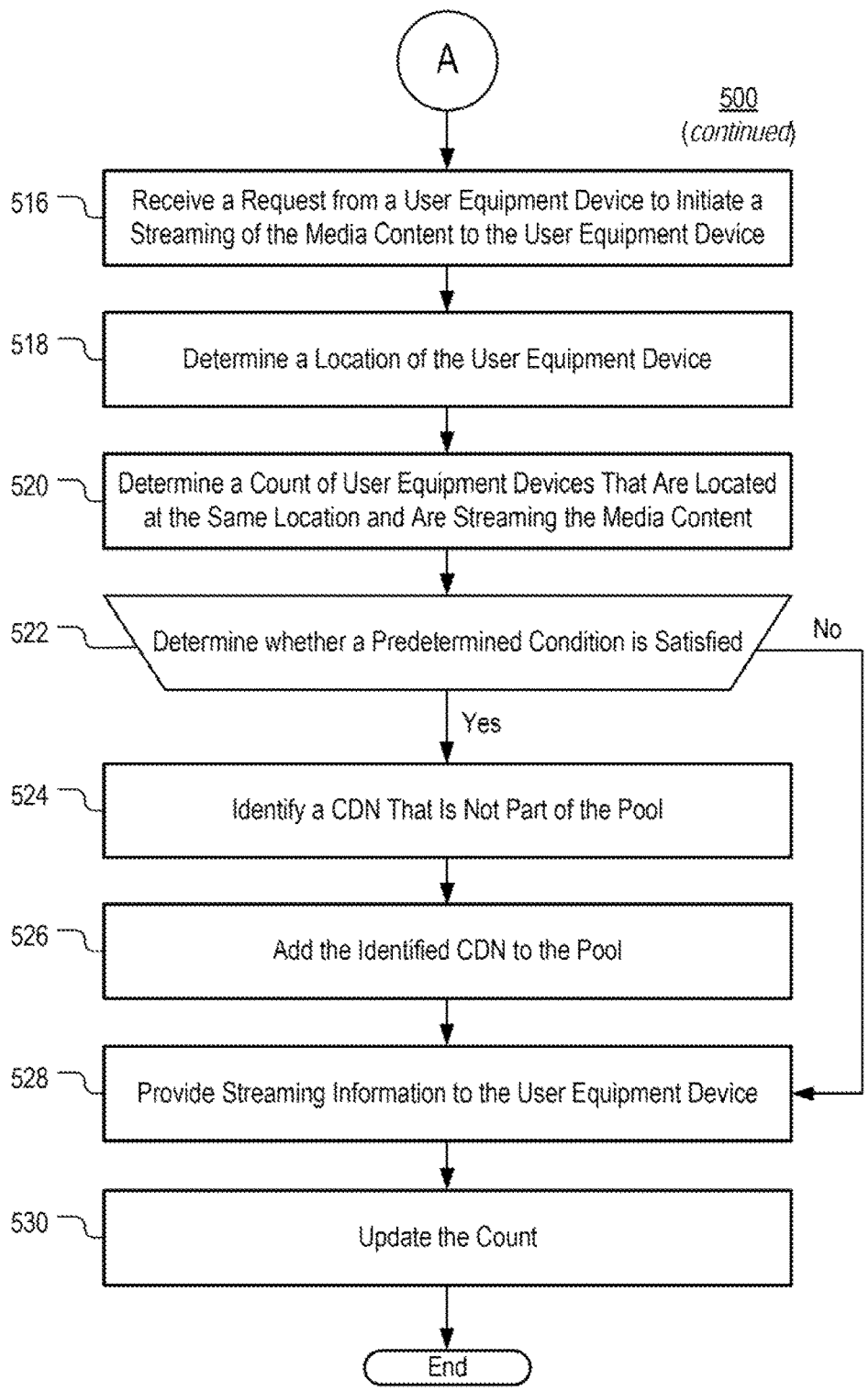

FIGS. 5A and 5B depict a flowchart of an example of a process 500 for distributing media content in accordance with some embodiments of the disclosed subject matter.

At 502, one or more first records may be stored in memory or any other suitable location. The one or more first records may include identifiers for a pool of one or more content delivery networks (CDNs) that can be used to stream media content to a plurality of user equipment devices. Any suitable type of identifiers may be used in the first record(s) in some embodiments. For example, in some embodiments, an identifier of a CDN in the pool may include an identifier for a component of the CDN, such as a gateway or a load balancer. Step 502 may be performed by: a media guidance data source, such as media guidance data source 218; processing circuitry of the media guidance data source; and/or any other suitable device or processing circuitry thereof.

At 504, one or more second records may be stored in memory or any other suitable location. The second record(s) may include information relating to the geographic distribution of user equipment devices that are currently streaming media content from CDNs in the pool. In some embodiments, the record(s) may identify a set of one or more locations. In some embodiments, for each location, the record may identify a count of user equipment devices that are located at that location and are currently streaming the media content. The count may be a string, a number, or an alphanumerical string that is based on (or indicative of) a number of user equipment devices that are streaming the media content.

In some embodiments, two or more user equipment devices may be considered to be at the same location when the user equipment devices are located in the same region as each other (e.g., in the same district, in the same service area, in the same telephone service area, in the same city, or in the same state, etc.). Any suitable definition of location may be used, in some embodiments.

Additionally or alternatively, in some embodiments, two or more user equipment devices may be considered to be at the same location when the user equipment devices are part of the same network domain (or the same network; or the same portion of a network) as each other. Additionally or alternatively, in some embodiments, two user equipment devices may be considered to be at the same location when one of the user equipment devices is part of a network domain (or a network; or a portion of a network) that is associated with a network domain (or a network; or a portion of a network) the other user equipment device is part of. Thus, in some embodiments, whether two user equipment devices are located at the same location may, at least in part, depend on the topology of network(s) the two user equipment devices are part of.

Additionally or alternatively, in some embodiments, a two user equipment devices may be considered to be at the same location when a first record corresponding to one of the user equipment devices contains an item of information (e.g., a number, a word, or an alphanumerical string) that satisfies a similarity criterion with respect to another item of information that is part of a second record that corresponds to the other user equipment device. Any suitable type of records may be used, in some embodiments. For example, the first record and the second record may be Domain Name Service (DNS) records, records maintained by Internet service providers, records maintained by network administrators, records maintained by content distributors, and/or any other suitable records.

To determine whether two or more user equipment devices are at the same location, any suitable similarity criterion may be used in some embodiments. For example, in some embodiments, the similarity criterion may be one that is satisfied when the two items of information are identical. As another example, in some embodiments, the similarity criterion may be one that is satisfied when the first item of information and the second item of information are within a predetermined distance from one another in the space of items of information from their type.

Step 504 may be performed by: a media guidance data source, such as media guidance data source 218; processing circuitry of the media guidance source and/or any other suitable device or processing circuitry thereof.

At 506, a fragment of the media content may be received. The fragment may be received in any suitable manner, in some embodiments. The fragment may include any suitable media content, such as media content data that is sufficient to render (e.g., in sound and/or in image) at least a portion of the media content (e.g., 2-10 seconds of the media content).

At 508, the fragment of the media content may be encoded to generate one or more media files that encode the fragment. The fragment may be encoded in any suitable manner, in some embodiments. For example, in some embodiments, one or more of the files may have a different encoding bit rate.

At 510, one or more CDNs in the pool may be identified. The one or more of the CDNs may be identified in any suitable manner, in some embodiments. For example, in some embodiments, a first record may be obtained and used to identify the CDNs.

At 512, at least some of the generated media files may be provided to the identified CDNs. The media files may be provided in any suitable manner, in some embodiments. For example, in some embodiments, at least some of the generated media files may be uploaded via a File Transfer Protocol (FTP) connection to each of the CDNs. Upon uploading any one of the media files to a given CDN, the address (e.g., Uniform Resource Locator (URL)) of that file at the CDN may be recorded. In some embodiments, the addresses (of some or all) of the media files at different CDNs may be recorded. These addresses, as is further discussed below, may be usable by user equipment devices to obtain the media files when the content is being streamed.

At 514, the addresses of the media files may be provided to media guidance data source, such as media guidance data source 218. The addresses may be provided in any suitable manner, in some embodiments.

Each of steps 506-514 may be performed by: an encoder, such as media encoder 230; and/or any other suitable device.

At 516, a request may be received from a user equipment device to initiate a streaming of the content to the user equipment device. The request may be received in any suitable manner in some embodiments. For example, in some embodiments, the request may be transmitted over a communications network, such as network 214. In some embodiments, the request may be received at a media guidance data source, such as media guidance data source 218.

At 518, the location of the user equipment device may be determined. The device may be determined in any suitable manner, in some embodiments. For example, in some embodiments, determining the location, in some embodiments, may include obtaining an identifier that is indicative of the user equipment device's physical location, such as: an identifier of a network domain (or portion thereof) the device is part of; an identifier of a network (or portion thereof) the device is part of; coordinates of the device (e.g., by using a Global Positioning System (GPS) capability that is built into the device); and/or any other suitable identifier. Additionally or alternatively, in some embodiments, the location of the user equipment device may be determined by using an instance of the nslookup utility. Additionally or alternatively, in some embodiments, determining the location of the user equipment device may include retrieving a record (e.g., a DNS record, a record maintained by an Internet Service provider, and/or any other suitable type of record) that corresponds to the user equipment device and obtaining an item of information that is part of the retrieved record that is indicative of the location of the user equipment device. Any suitable item of information may be used in some embodiments. For example, in some embodiments, the item of information may include: an item of information that is indicative of a network domain (or portion thereof); an item of information that is indicative of a network (or portion thereof); an item of information that is indicative of a city; an item of information that is indicative of a physical address; an item of information that is indicative of a network address; and/or any other suitable item.

At 520, a count of user equipment devices that are located at the same location as the user equipment device and are streaming the media content may be determined. This count may be determined in any suitable manner, in some embodiments. For example, in some embodiments, one of the first records may be obtained and used to identify the count. Additionally or alternatively, in some embodiments, the count may be determined based on responses to queries transmitted over a communications network to one or more devices/systems that are responsible for routing user equipment devices to CDNs (e.g., in the same manner as the device/system executing steps 516-530) and receiving respective counts of user equipment devices at the location that are currently streaming the media content and have been assisted in streaming the media content by each of the CDNs.

At 522, a determination may be made whether a predetermined condition is satisfied. Any suitable predetermined condition may be used, in some embodiments. For example, in some embodiments, the predetermined condition may be based on the count. For example, the predetermined condition may be one that is satisfied when the count meets (e.g., exceeds, equals, or falls below) a predetermined threshold.

Additionally or alternatively, in some embodiments, the predetermined condition may be based on a value of a quality of service metric of a communications path connecting a CDN that is used to provide media content with a user equipment device that is streaming the content. Any suitable quality of service metric may be used. For example, the quality of service metric may be latency, bandwidth, jitter, and/or any other suitable quality of service metric. Thus, in some embodiments, the predetermined criterion may be a criterion that is satisfied when the quality of service metric meets a predetermined threshold.

Additionally or alternatively, in some embodiments, the predetermined condition may be based on a plurality of quality of service metric values, wherein each quality of service value is for a different one of a plurality of communications paths. Each communications path may be one that connects a CDN that is used to provide the media content with user equipment. Each communication path may be one that is leading to different one of a plurality of user equipment devices that are streaming the content. In some embodiments, the predetermined condition may be based on an average, median, and/or any other suitable statistical characteristic of the plurality of quality of service metric values.

When the predetermined condition is determined to be satisfied, the execution of process 500 proceeds to step 524. Otherwise, when the predetermined condition is found to not be satisfied, the execution of process 500 proceeds to step 528.

At 524, an additional CDN that is available to stream the media content may be identified. This identification may be performed in any suitable manner, and any suitable CDN may be identified, in some embodiments. The additional CDN, in some embodiments, may include a plurality of computing devices (e.g., servers, load balancers, cache servers, and/or any suitable type of computing device). In some embodiments, the additional CDN may be implemented using a data center that is different from the data centers used to implement the CDNs in the pool. For example, the data center of the additional CDN may be at a different geographic location than the data centers of the other CDNs in the pool.

In some embodiments, the additional CDN may be selected from a plurality of available CDNs. Additionally or alternatively, the CDN may be selected based on a predetermined criterion. Any suitable criterion may be used, in some embodiments. For example, in some embodiments, the CDN may be selected based on a geographic location corresponding to the CDN (e.g., a geographic location where a data center that is used to implement the CDN is located).

As another example, in some embodiments, the CDN may be selected from the plurality of available CDNs based on a QoS metric associated with the CDN, such as latency or bandwidth. For example, in some embodiments, the QoS metric associated with the CDN may indicate one of the latency, bandwidth, or throughput for one or more communications paths between a component of the CDN (e.g., a load balancer) and a device located at a predetermined location, such as the location determined at step 518 and/or any other suitable location.

As yet another example, in some embodiments, the CDN may be selected from the plurality of available CDNs based on a price associated with the CDN (e.g., a price for a unit of bandwidth that is made available for serving the media content or price for a unit of bandwidth that is consumed by streaming the media content, a price for a unit of data served, etc.). For example, the CDN may be selected based on having the lowest associated price.

As yet another example, in some embodiments, the CDN may be selected from the plurality of available CDNs based on distance from CDNs in the pool. For example, the CDN may be selected based on being situated the furthest, of all CDNs in the plurality, from a given CDN in the pool. The distance between different CDNs may be based on the physical distance, the logical distance, and/or the network distance between the locations of data centers that are used to implement the CDNs.

In some embodiments, the additional CDN may be implemented using a different data center than data centers used to implement CDNs in the pool. In some embodiments, the additional CDN may include a plurality of computing devices (e.g., load balancers, cache servers, storage servers, etc.).

At 526, the CDN identified at step 524 may be added to the pool of CDNs that are responsible for streaming the media content. The CDN may be added in any suitable manner, in some embodiments. For example, in some embodiments, adding the CDN to the pool may include adding an identifier for the CDN to one or more of the first records. Additionally or alternatively, in some embodiments, adding the identified CDN to the pool may include configuring an encoder, such as media encoder 230, to start uploading media files corresponding to fragments of the media content to the CDN. Additionally or alternatively, configuring the encoder may include providing (e.g., transmitting over a communications network) an identifier for the CDN to the encoder.

At 528, the user equipment device may be provided with information that may be usable by the user equipment device to begin streaming media content. Any suitable information may be provided, and this information may be provided in any suitable manner, in some embodiments. For example, the information may include an address (e.g., a URL) that is usable to retrieve a media file from a CDN from the pool. The media file may be one that corresponds to a fragment of a media stream and is uploaded to the CDN by an encoder, such media encoder 230, in some embodiments. In some embodiments, in instances where the count is determined to meet the threshold at 522, the address may point to an instance of the media file that is stored at the CDN identified at step 524. The user equipment device may then use the streaming information to stream the media content from of the CDNs in the pool.

At 530, the record indicating the geographic distribution of the user equipment devices may be updated. This record may be updated in any suitable manner, in some embodiments. For example, in some embodiments, the count determined at step 520 may be incremented by one (or otherwise changed) in order to reflect that the user equipment device has begun streaming the media content based on the streaming information provided at step 528, in some embodiments.

Any of steps 516-530 may be performed by: a media guidance data source, such as media guidance data source 218; processing circuitry of the media guidance data source; and/or any other suitable device or processing circuitry thereof.

In some embodiments, a functional separation may be maintained between. As noted above, steps 506-514 may be performed by one or more media encoders, whereas steps 516-530 may be performed by a media guidance data source. Thus in some embodiments, failsafe mechanism (for adding CDN's to the pools e.g., the determination whether the predetermined condition is satisfied) may be implemented at a device that is separate from any media encoders.

Although in the above example a CDN is added to a pool CDNs that are responsible for streaming the media content, in other examples, when the count meets the threshold, a server may be added to a pool of servers that are used to stream the content, in some embodiments. For example, once added, that server may begin to receive streaming resources associated with the pool as discussed with respect to step 528. The address of that server may be provided to user equipment devices that seek to begin streaming the media content and the server may begin providing the media content to any devices that establish a connection with the server, in some embodiments.

It should be noted, however, that in some embodiments, adding a server to a pool of servers may be different from adding a CDN to a pool. In some embodiments, adding a new CDN to a pool of CDN may involve utilizing another data center to distribute the media content along with underlying data center infrastructure, such as load balancers and caching servers. The data center may be at a different location than other data centers in the pool and, thus, adding the CDN to the pool may provide user equipment devices located at the first location with additional network paths to stream the media content over. This in turn may prevent congestion of network paths spanning between the first location and other CDNs in the pool.

The above steps of the flow diagrams of FIGS. 5A-B may be executed or performed in any order or sequence not limited to the order and sequence shown and described in the figures. Some of the above steps of the flow diagrams of FIGS. 5A-B may be executed or performed substantially simultaneously where appropriate or in parallel to reduce latency and processing times. Some of the above steps of the flow diagrams of FIGS. 5A-B may be omitted. Although the above embodiments of the invention are described in reference to live content streaming, the techniques disclosed herein may be used in any type of data downloading, including non-live streaming of media content.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above described embodiments of the present disclosure are presented for purposes of illustration and not of limitation, and the present disclosure is limited only by the claims which follow.

What is claimed is:

1. A system for live streaming of content, the system comprising:
an architecture comprising a hardware media encoder and a hardware management server connected via a communications network; wherein:
the media encoder is configured for real-time encoding and uploading a live content stream of a live event to a pool of content delivery networks for use in distributing the live content stream to a plurality of user equipment devices, wherein the pool of content delivery networks utilizes communication paths to stream the live content stream to the user equipment devices;
the management server is configured to:
maintain the pool of content delivery networks for use in distributing the live content stream, wherein each content delivery network of the pool of content delivery networks comprises load balancing servers, gateways, and storage servers connected via the communications network;
receive a request to stream the live content stream from a particular user equipment device, wherein the particular user equipment device has a first geographic location that is shared with a plurality of user equipment devices;
provide a listing of content delivery networks of the pool of content delivery networks to the media encoder, wherein the media encoder encodes and uploads a first fragment of the live content stream to the pool of content delivery networks;
provide, to the particular user equipment device, a manifest that identifies the pool of content delivery networks, wherein the particular user equipment device requests at least a portion of the live content stream from a first content delivery network from the pool of content delivery networks over a first distribution path;
determine whether a predetermined condition is satisfied, wherein the predetermined condition comprises whether a count of user equipment devices that are located at the first geographic location and are currently streaming the content from the pool of content delivery networks exceeds a threshold quantity of streaming user equipment devices;
when the predetermined condition is satisfied:
select an additional content delivery network from a set of available content delivery networks to add to the pool of content delivery networks based on a plurality of factors comprising at least:
distance between a second geographic location corresponding to the additional content delivery network and geographic locations corresponding to content delivery networks within the pool of content delivery networks,
latency along at least one different distribution path between the additional content delivery network and the particular user equipment device, and
throughput for at least one different distribution path between the additional content delivery network and the particular user equipment device;
update the pool of content delivery networks to include the additional content delivery network, wherein the additional content delivery network comprises a load balancing server, a gateway, and a storage server connected via a communications network;
provide an updated listing of the updated pool of content delivery networks, including the additional content delivery network, to the media encoder, wherein the media encoder encodes and uploads a second fragment of the live content stream to the updated pool of content delivery networks, including the additional content delivery network, to stream the live content stream using a distribution path including the additional content delivery network from the updated pool of content delivery networks; and
provide, to the particular user equipment device, an updated manifest that identifies the additional content delivery network, wherein the particular user equipment requests at least a portion of the live content stream from the additional content delivery network.

2. The system of claim 1, wherein the predetermined condition further comprises whether a plurality of quality of service metric values satisfy certain thresholds.

3. The system of claim 1, wherein throughput comprises network bandwidth.

4. The system of claim 1, wherein providing the updated listing of the updated pool of content delivery networks comprises providing the media encoder with an identifier of the selected additional content delivery network, wherein the identifier identifies at least one of a gateway and a load balancer for the additional content delivery network.

5. The system of claim 1, wherein the management server is further configured to maintain records relating to the geographic distribution of user equipment devices that are currently streaming content.

6. The system of claim 1, wherein the plurality of factors further includes a price per unit of bandwidth associated with the additional content delivery network.

7. A method for live streaming of content, comprising:
encoding and uploading a first fragment of a live content stream of a live event to a pool of content delivery networks for use in distributing the live content stream in real-time to a plurality of user equipment devices, wherein the pool of content delivery networks utilizes communication paths to stream the live content stream to user equipment devices, wherein each content delivery network of the pool of content delivery networks comprises load balancing servers, gateways, and storage servers connected via a network;
receiving a request to stream the live content stream from a particular user equipment device, wherein the particular user equipment device has a first geographic location that is shared with a plurality of user equipment devices;

providing to the particular user equipment device, a manifest that identifies the pool of content delivery networks that contains at least a portion of the live content stream;

streaming content to the particular user equipment device using a first content delivery network from the pool of content delivery networks over a first distribution path;

determining whether a predetermined condition is satisfied, wherein the predetermined condition comprises whether a count of user equipment devices that are located at the first geographic location and are currently streaming the content from the pool of content delivery networks exceeds a threshold quantity of streaming user equipment devices;

when the predetermined condition is satisfied:
  selecting an additional content delivery network from a set of available content delivery networks to add to the pool of content delivery networks based on a plurality of factors comprising at least:
    distance between a second geographic location corresponding to the additional content delivery network and geographic locations corresponding to content delivery networks within the pool of content delivery networks,
    latency along at least one different distribution path between the additional content delivery network and the particular user equipment device, and
    throughput for at least one different distribution path between the additional content delivery network and the particular user equipment device;
  updating the pool of content delivery networks to include the additional content delivery network, wherein the additional content delivery network comprises a load balancing server, a gateway, and a storage server connected via a communications network;
  encoding and uploading a second fragment of the live content stream for the updated pool of content delivery networks, including the additional content delivery network, to stream the live content stream using a distribution path including the additional content delivery network from the updated pool content delivery networks; and
  providing, to the particular user equipment device, an updated manifest that identifies the additional content delivery network, wherein the particular user equipment requests at least a portion of the live content stream from the additional content delivery network.

8. The method of claim 7, wherein the predetermined condition further comprises whether a plurality of quality of service metric values satisfy certain thresholds.

9. The method of claim 7, wherein throughput comprises network bandwidth.

10. The method of claim 7, wherein encoding and uploading the live content stream for the updated pool of content delivery networks comprises providing an encoder with an identifier of the selected additional content delivery network, wherein the identifier identifies at least one of a gateway and a load balancer for the additional content delivery network.

11. The method of claim 7, wherein the method further comprises maintaining records relating to the geographic distribution of user equipment devices that are currently streaming content.

12. The method of claim 7, wherein the plurality of factors further includes on a price per unit of bandwidth associated with the additional content delivery network.

* * * * *